US006671692B1

(12) United States Patent
Marpe et al.

(10) Patent No.: US 6,671,692 B1
(45) Date of Patent: Dec. 30, 2003

(54) SYSTEM FOR FACILITATING THE NAVIGATION OF DATA

(75) Inventors: James S. Marpe, Westport, CT (US); David W. Coyle, Alpharetta, GA (US); Bruce P. Kiene, Mesa, AZ (US); Gregory P. Chestnut, Boothwyn, PA (US); John F. Durocher, Dedham, MA (US); Scott R. Adler, Boston, MA (US); Laura L. Farner, Mt. Lebanon, PA (US); Karen L. Backes, Minneapolis, MN (US); Robin Pepper, New York, NY (US); Suzanne M. Gouzie, Charlestown, MA (US); Alan R. Christensen, Houston, TX (US); Christopher A. Rininger, Minneapolis, MN (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/447,941

(22) Filed: Nov. 23, 1999

(51) Int. Cl.[7] ............................................... G06F 17/30
(52) U.S. Cl. ....................... 707/102; 715/514; 709/229; 345/761; 345/762
(58) Field of Search .............................. 707/1–3, 9–10, 707/103–104.1; 709/223, 229; 705/7–9, 27, 37; 345/707, 713, 761–762, 772; 379/93, 23, 212.01, 10.03; 715/514

(56) References Cited

U.S. PATENT DOCUMENTS

| 4,751,635 A | 6/1988 | Kret |
| 5,193,185 A | 3/1993 | Lanter |
| 5,208,748 A | 5/1993 | Flores et al. |
| 5,233,513 A | 8/1993 | Doyle |
| 5,303,170 A | 4/1994 | Valko |
| 5,463,555 A | 10/1995 | Ward et al. |
| 5,490,097 A | 2/1996 | Swenson et al. |
| 5,504,890 A | 4/1996 | Sanford |
| 5,544,360 A | * 8/1996 | Lewak et al. ................... 707/1 |
| 5,548,506 A | 8/1996 | Srinivasan |
| 5,581,691 A | 12/1996 | Hsu et al. |
| 5,649,116 A | 7/1997 | McCoy et al. |
| 5,675,788 A | * 10/1997 | Husick et al. ........... 707/104.1 |
| 5,701,400 A | 12/1997 | Amado |
| 5,724,577 A | * 3/1998 | Exley et al. ................. 345/841 |
| 5,737,727 A | 4/1998 | Lehmann et al. |
| 5,765,140 A | 6/1998 | Knudson et al. |
| 5,799,286 A | 8/1998 | Morgan et al. |
| 5,826,252 A | 10/1998 | Wolters, Jr. et al. |
| 5,836,011 A | 11/1998 | Hambrick et al. |
| 5,857,181 A | * 1/1999 | Augenbraun et al. .......... 707/2 |
| 5,864,480 A | 1/1999 | Ladd |
| 5,870,768 A | 2/1999 | Hekmatpour |

(List continued on next page.)

FOREIGN PATENT DOCUMENTS

WO      WO 9731320      8/1997

OTHER PUBLICATIONS

"User's Guide for Microsoft Project for Windows 95 and Windows 3.1," copyright 1995.

(List continued on next page.)

Primary Examiner—Jean R. Homere
Assistant Examiner—Mohammad Ali
(74) Attorney, Agent, or Firm—W. Glenn Edwards; Oppenheimer Wolff & Donnelly LLP

(57) ABSTRACT

A method for facilitating the navigation of application specific data on a data page, i.e. web page, during use of a data browser, i.e. Netscape™, MS Explorer™, etc. Included on the data page are a plurality of links each corresponding to data. In use, the data may be retrieved upon selection of the corresponding link. To facilitate the navigation of the data, the links are displayed each as a component of an indicia such as a pointer or chevron to imply a relationship between the data.

18 Claims, 26 Drawing Sheets

U.S. PATENT DOCUMENTS

| | | | |
|---|---|---|---|
| 5,875,446 A | * | 2/1999 | Brown et al. ............ 345/970.1 |
| 5,893,074 A | | 4/1999 | Hughes et al. |
| 5,907,490 A | | 5/1999 | Oliver |
| 5,950,217 A | | 9/1999 | Heinlein et al. |
| 6,006,193 A | | 12/1999 | Gibson et al. |
| 6,009,407 A | | 12/1999 | Garg |
| 6,009,420 A | | 12/1999 | Fagg et al. |
| 6,061,506 A | | 5/2000 | Wollaston et al. |
| 6,061,690 A | * | 5/2000 | Nori et al. .................. 707/100 |
| 6,092,048 A | | 7/2000 | Nakaoka |
| 6,154,731 A | | 11/2000 | Monks et al. |
| 6,161,101 A | | 12/2000 | Guinta et al. |
| 6,247,145 B1 | | 6/2001 | Wittereid |
| 6,308,164 B1 | | 10/2001 | Nummelin et al. |
| 6,321,206 B1 | | 11/2001 | Honarvar |
| 6,321,374 B1 | | 11/2001 | Choy |
| 6,332,163 B1 | | 12/2001 | Bowman-Amuah |
| 6,351,738 B1 | | 2/2002 | Clark |
| 6,363,360 B1 | | 3/2002 | Madden |
| 6,370,562 B2 | | 4/2002 | Page et al. |

OTHER PUBLICATIONS

Cleetus, K. J. et al., "PACT—a software package to manage projects and coordinate people", Proceedings of the 5th Workshops on Enabling Technologies: Infrastructure for Collaborative Enterprises (WET ICE '96) (96TB100058), Proceedings Wet Ice '96, IEEE 5th Workshop on Enabling Technologies; Infrastructure for Collaborative Enterprises, St, pp. 162–169, 1996, Los Alamitos, CA, USA, IEEE Compt. Soc.

Mason, K., "Bulletin Board and Notepad For Reminders (ICONS)" Research Disclosure, Kenneth Mason Publ., Hampshire, GB, No. 312, (Apr. 1, 1990), pp. 322.

Microsoft Team Manager 97 Brochure, Online! 1997, XP002165311 Retriev. From Internet: <URL:http://www/microsoft.com/office/teammanager/tmm97brch/>.

"Project Management Environment", IBM Tech. Disclosure Bulletin, US, IBM Corp. New York, vol. 32, No. 9A, (Feb. 1, 1990), pp. 250–254.

Planning Big with Mac Project, James Halcomb. 1986.

* cited by examiner

| 112 | SYSTEM BUS |
| 120 | DISK STORAGE UNIT |
| 124 | KEYBOARD |
| 126 | MOUSE |
| 128 | SPEAKER |
| 132 | MICROPHONE |
| 138 | DISPLAY DEVICE |

SYSTEM FOR FACILITATING THE NAVIGATION OF DATA

FIELD OF INVENTION

The present invention relates to browsing data using a data browser and more particularly pertains to facilitating the navigation of application specific data with a data browser using a plurality of links.

BACKGROUND OF THE INVENTION

In the past, instructional databases have been commonly used to provide users with a plethora of information. Such information may be used to execute various tasks or enable the users to accomplish a goal. Often, such instructional databases may be stored on a centralized server and provide access to a plurality of client computers via a network. In some instances, such network is the Internet in which case the database is accessed via a web site.

Such prior art instructional databases, however, often utilize a conventional hypertext system which makes it particularly difficult to navigate the information in a progression that the original designers intended without sacrificing the ability of the user to freely navigate the information. Further, none of such prior art instructional databases allow an effective exchange of ideas in order to achieve a goal at hand.

Still yet another feature that the prior art instructional databases lack is the ability to track a progression of an effort to achieve an intended goal. Finally, the prior art instructional databases have never been used to facilitate a merger and acquisition situation.

SUMMARY OF INVENTION

A method for facilitating the navigation of application specific data on a data page, i.e. web page, during use of a data browser, i.e. Netscape™, MS Explorer™, etc. Included on the data page are a plurality of links each corresponding to data. In use, the data may be retrieved upon selection of the corresponding link. To facilitate the navigation of the data, the links are displayed each as a component of an indicia such as a pointer or chevron to imply a relationship between the data.

In one embodiment of the present invention, the aforementioned relationship is a progressional relationship and the indicia implies a direction of progressional movement through the data. In order to imply direction, the indicia may take the form of a chevron or any other type of pointer that implies direction. As an option, each of the components of indicia may also be shaped as a chevron.

In yet another embodiment of the present invention, a currently selected link is visually differentiated with respect to the remaining links. This may be accomplished by highlighting a currently selected link. Further, the links may be continuously displayed with the data in order to continuously imply the progressional relationship and a current location among the data.

DESCRIPTION OF DRAWINGS

The foregoing and other objects, aspects and advantages are better understood from the following detailed description of a preferred embodiment of the invention with reference to the drawings, in which.

DETAILED DESCRIPTION

Figure 1:
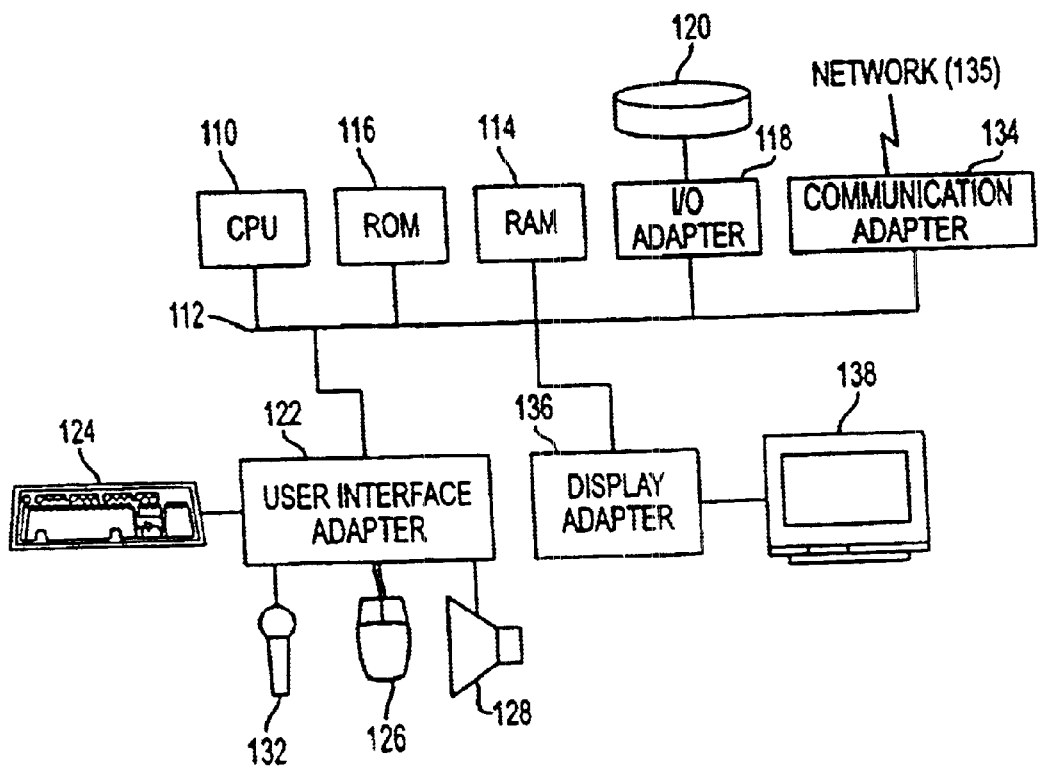
FIG. 1 is a schematic diagram of the present invention.

In accordance with at least one embodiment of the present invention, a single entry point is provided for merger/ acquisition participants to access related information and deliverables utilizing Intranet technology. Entry may be accomplished using a hardware implementation such as is illustrated in FIG. 1. Further, various functional and user interface features of the present invention may be enabled using software programming, i.e. object oriented programming (OOP).

Hardware Overview

A representative hardware environment of a preferred embodiment of the present invention is depicted in FIG. 1, which illustrates a typical hardware configuration of a workstation having a central processing unit 110, such as a microprocessor, and a number of other units interconnected via a system bus 112. The workstation shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT™ or Windows/ 95™ Operating System (OS), the IBM OS/2 operating system, the MAC OS™, or UNIX™ operating system.

Software Overview

Object oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increase in the speed of its development.

Programming languages are beginning to fully support the OOP principles, such as encapsulation, inheritance, polymorphism, and composition-relationship. With the advent of the C++™ language, many commercial software developers have embraced OOP. C++™ is an OOP language that offers a fast, machine-executable code. Furthermore, C++™ is suitable for both commercial-application and systems-programming projects. For now, C++™ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers. Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java™ language solves many of the client-side problems by:

Improving performance on the client side;

Enabling the creation of dynamic, real-time Web applications; and

Providing the ability to create a wide variety of user interface components.

With Java™, developers can create robust User Interface (UI) components. Custom "widgets" (e.g., real-time stock tickers, animated icons, etc.) can be created, and client-side performance is improved. Unlike HTML, Java™ supports the notion of client-side validation, offloading appropriate processing onto the client for improved performance. Dynamic, real-time Web pages can be created. Using the above-mentioned custom UI components, dynamic Web pages can also be created.

Sun's Java™ language has emerged as an industry-recognized language for "programming the Internet." Sun defines Java™ as "a simple, object-oriented, distributed, interpreted, robust, secure, architecture-neutral, portable, high-performance, multithreaded, dynamic, buzzword-compliant, general-purpose programming language. Java™ supports programming for the Internet in the form of platform-independent Java™ applets." Java™ applets are small, specialized applications that comply with Sun's Java™ Application Programming Interface (API) allowing developers to add "interactive content" to Web documents (e.g., simple animations, page adornments, basic games, etc.). Applets execute within a Java-compatible browser (e.g., Netscape™ Navigator) by copying code from the server to client. From a language standpoint, Java's™ core feature set is based on C++™. Sun's Java™ literature states that Java™ is basically, "C++™ with extensions from Objective C for more dynamic method resolution."

Another technology that provides similar function to JAVA™ is provided by Microsoft and ActiveX™ Technologies, to give developers and Web designers wherewithal to build dynamic content for the Internet and personal computers. ActiveX™ includes tools for developing animation, 3-D virtual reality, video and other multimedia content. The tools use Internet standards, work on multiple platforms, and are being supported by over 100 companies. The group's building blocks are called ActiveX™ Controls, which are fast components that enable developers to embed parts of software in hypertext markup language (HTML) pages. ActiveX™ Controls work with a variety of programming languages including Microsoft Visual C++™, Borland Delphi™, Microsoft Visual Basic™ programming system and, in the future, Microsoft's development tool for Java™, code named "Jakarta." ActiveX™ Technologies also includes ActiveX™ Server Framework, allowing developers to create server applications. One of ordinary skill in the art readily recognizes that ActiveX™ could be substituted for JAVA™ without undue experimentation to practice the invention.

Merger and Acquisition Engine System Overview

The Merger and Acquisition (M&A) Engine provides knowledge management and delivery capabilities to facilitate the learning and execution of merger-related work. In one embodiment, this is accomplished by storing the M&A Engine on a centralized server which may be accessed over a network, i.e. the Internet, via a web site using a hardware implementation set forth hereinabove and shown in FIG. 1.

During operation, the M&A Engine facilitates user work, manages and delivers reusable knowledge, improves the ability to manage change resulting from mergers and acquisitions, and expedites the learning process for new merger resources. The M&A Engine streamlines communication between merger participants, and assists in the consolidation of projects. The M&A Engine can also be used as a marketing tool. In addition, the M&A Engine promotes standardization of processes that are applicable to individual areas such as status reporting, business case development, and budget and benefits monitoring.

Using the M&A Engine, productivity is improved during the transition by increased communication. Merger/acquisition participants are given a common entry point to effectively access information and deliverables, leverage existing knowledge, contribute knowledge, conduct informal conversations, document meeting outcomes and issues, etc.

The M&A Engine improves documentation and outcomes by providing users access to the entire history of an on-line discussion. This functionality improves the understanding of issues and/or topics, e.g. conversion schedule, DARTs, etc., as well as what decisions or progress has been made towards a resolution. The M&A Engine improves issue resolution during the transition by utilizing discussion databases to submit and/or answer issues, questions, topics, etc. This gives key stakeholders an improved understanding of the most current status of key deliverables.

The M&A Engine's streamlined communication throughout the transition yields benefits such as:

Improved creativity through more frequent communication with subject matter experts and on-line brainstorming sessions or idea sharing;

Reduced project completion cycles due to increased communication and collaboration of ideas, e.g. sharing of best practices, discussion databases, etc.;

Reduced costs due to fewer printed pages to distribute mass communications, e.g. administrative memos, phone directories, newsletters, etc., and key deliverables by providing information on-line; and Reduced telephone, video conferencing, and travel costs, as users are able to conduct "virtual meetings" via the M&A Engine discussion databases.

The M&A Engine supports standardization of consolidation activities and deliverables. Users are consistently guided through the steps to complete merger/acquisition activities, and are provided samples and templates to facilitate the completion of deliverables associated with those activities. The M&A Engine also develops and retains institutional knowledge related to consolidation, thus reducing costs related to training and use of outside consultants.

The M&A Engine also supports the evolution of process-driven methods for the transition by utilizing the Intranet as its delivery vehicle. Through the M&A Engine, users are able to "drill-down" from a merger activity to specific task packages and deliverables. This capability improves the understanding throughout the organization of the complete range of activities that are involved with the consolidation of two or more organizations.

One embodiment of the M&A Engine includes a plurality of features for accomplishing the foregoing goals. For example, the present invention includes Navigation Chevron, a Discussion Database, a Discussion Database Interface Page, a 30/60/90 Plan, and a Merger Site Map. A workbench homepage is used to navigate the user through the M&A Engine environment. The Discussion Database is used to discuss concepts and serve as an audit trial of topics. The Discussion Database Interface Page describes the various discussion groups available to the user, and subscribes the user to individual discussion groups when selected. The 30/60/90 Plan is used to account for all actions taken during the first 90 days of consolidation. Finally, the Merger Site Map tracks activities and duration of these activities throughout the consolidation.

Navigation Chevron

The Navigation Chevron of the present invention is a form of hypertext that facilitates the navigation of data during use of the M&A Engine. Hypertext systems are a class of complex information management systems. These systems allow people to create, annotate, link together, and share information from a variety of media such as text, graphics, audio, video, animation, and programs. They also provide flexible access to information by incorporating the notions of navigation, annotation, and tailored presentation.

Hypertext is defined as an approach to information management in which data is stored in a network of nodes connected by links. Nodes can contain text, graphics, audio, video as well as source code or other forms of data. Hypertext with multimedia is called "hypermedia". The utility of hypermedia lies in its ability to produce large, complex, richly connected, and cross-referenced bodies of information.

Outside the academic world, due to the implementation of hypertext-like features in products such as MS Windows Help, information systems professionals are of the opinion that hypertext is just another user interface approach. However, hypertext is a hybrid that spans across traditional boundaries. It is a database method providing a novel way of directly accessing and managing data. It is also a representation scheme, a kind of semantic network, which mixes informal textual material with more formal and mechanized processes. It is an interface modality that features link icons or markers that can be arbitrarily embedded with the contents and can be used for navigational purposes. In short, a hypertext system is a database system which provides a totally different and unique method of accessing information. Whereas traditional databases have some structure around them, a hypertext database has no regular structure. The user is free to explore and assimilate information in different ways.

A hypertext system is made of nodes, or concepts, and links, or relationships. A node usually represents a single concept or idea. It can contain text, graphics, animation, audio, video, images or programs. It can be typed and can include detail, proposition, collection, summary, observation, and issue, thereby carrying semantic information. Nodes are connected to other nodes by links. The node from which a link originates is called the reference and the node at which a link ends is called the referent. They are also referred to as anchors. The contents of a node are displayed by activating links.

Links connect related concepts or nodes. They can be bidirectional thus facilitating backward traversals. Links can also be typed, i.e. specification link, elaboration link, membership link, opposition link and others, specifying the nature of relationship. Links can be either referential for cross-referencing purposes or hierarchical for showing parent-child relationships. Activation of a link marker displays a node.

Hypertext parallels human cognition and facilitates exploration. People think in nonlinear chunks which they try to associate with each other, thus building a network of concepts. When a person reads a book, they go back and forth a number of times to refer to previously read material, to make notes, and to jump to topics using the table of contents or the index. When they set out to write a document, they first develop an outline of ideas. Then, a person brainstorms, writes down on paper, organizes, revises, reorganizes and repeats the cycle until they are satisfied with the outcome—a coherent document. In fact, people have been forced to adapt to traditional, linear text because of representation on paper.

In order to understand hypertext, it is very essential to understand how people read and write documents. Reading and writing models have been developed by cognitive psychologists that can be used to understand non-linear thinking by human beings.

The theory of semiotics or the study of symbols shows that the understanding of knowledge takes place at four levels: lexical, syntactic, semantic and pragmatic. At the lexical level, the user determines the definition for each word encountered. At the syntactic level, the subject, action and object of a sentence are determined. The meaning of a sentence is determined at the semantic level. The pragmatic interpretation of text depends on the integration of semantic meaning of text with the reader's knowledge of self and of the world.

While reading text, people proceed from a lexical level to the syntactic level, to the semantic and to the pragmatic levels in that order. All these levels interact continuously and they cannot be truly separated. The reader might have to have knowledge of the world in order to understand the meaning of a word. The correct syntactic and semantic interpretation of text may depend on the reader's knowledge of the world. Hence, though readers may proceed from words to sentences, to paragraphs and to the overall document, the progress is more forward and backward.

A mental representation of the meaning of text is then constructed which is in the form of propositions or relationships. While reading text, readers establish local coherence in short-term memory—small scale inferences from few small units of information, i.e. relationships between words, sentences and so on. The reader makes preliminary hypotheses based on titles, words, propositions, and knowledge about the real world. A reading control system retrieves knowledge from the real world, present in long-term memory, in order to filter out information present in short-term memory. These hypotheses are refined as the reading of the text proceeds, with the reading control system being invoked continuously. These propositions are combined into larger structures, also called global. This hypothesized macroproposition or superstructure is used to understand the overall content of the text. The construction of a coherent mental representation has important consequences for navigation. In addition to generating forward references, we accumulate cues for backward navigation.

The reading control system uses the spreading activation model to access propositions or concepts. In semantic memory, each concept is connected to a number of other concepts. Activating one concept activates its adjacent concepts which in turn activate their adjacent concepts. Thus, activation spreads through the memory structure, determining what is to be added and what is to be removed from the interpretation of text. This process continues until further activation of adjacent propositions does not change the propositions used to interpret the text. That is, spreading activation decreases over time and semantic distance.

Writing is constrained by goal and audience. The author is guided by a goal but constrained by what the audience is prepared to accept. Different people approach writing in different ways. Some are good at making an outline first and then brainstorming. Some do the opposite. An expert author would always keep the reading model in mind so that the writing clearly reaches the target audience.

Writing involves the following three phases: exploring, organizing, and encoding. In the Cognitive Framework for Written Communication, Smith et al. call these three phases prewriting, organizing, and writing.

Exploring or pre-writing is the process of brainstorming and taking unstructured notes. The writer retrieves potential content from long-term memory or external sources, considers possible relations among ideas, groups related ideas and constructs small hierarchical structures. Thus, the product of exploration is a network or directed graph of ideas.

Organizing is the process of putting these notes or ideas in order, in the form of an outline or a hierarchy. This process involves abstract construction that involves perceiving subordinate/superordinate relations, comparing abstractions, sequencing, proportion, and balance. Thus, the product of organization is a hierarchy of related concepts.

Encoding or writing is the final phase of completing the document. The primary task is translating the abstractions of content and the relations of a hierarchical structure into a sequence of words, sentences, paragraphs, sections, chapters, and illustrations. The structure of the encoded text is linear and represents a path through the hierarchy. Reading employs processes in the reverse order. That is, a linear sequence of words is transformed into a hierarchy which is later integrated into a network in long-term memory.

The writing model can be extended by considering unstructured and structured representation at each phase. Whereas an unstructured item is isolated, a structured item shows coherence. Exploring can be split into unstructured brainstorming followed by structured note-taking.

Organizing can be classified as unstructured argumentation where relationships are established between ideas and structured organization of notes where notes are grouped together to make coherent sense. Encoding has an unstructured phase of linear planning which involves viewing groups of notes as sequences and a structured phase of drafting and revising in order to produce a final document which is a linear sequence of notes.

Just as the reader of a linear document constructs a local and global mental representation of the document, the author of a linear document uses cues both at the local and at the global levels, dividing the document into chapters, sections, paragraphs, sentences, words etc. This facilitates comprehension and navigation.

Thus, both reading and writing processes emphasize a lot on the non-linear nature of thinking, a natural process in human beings. Human cognition is essentially organized as a semantic network in which concepts are linked together by associations. Hypertext systems try to exploit this basic nature of cognition.

Figure 2:
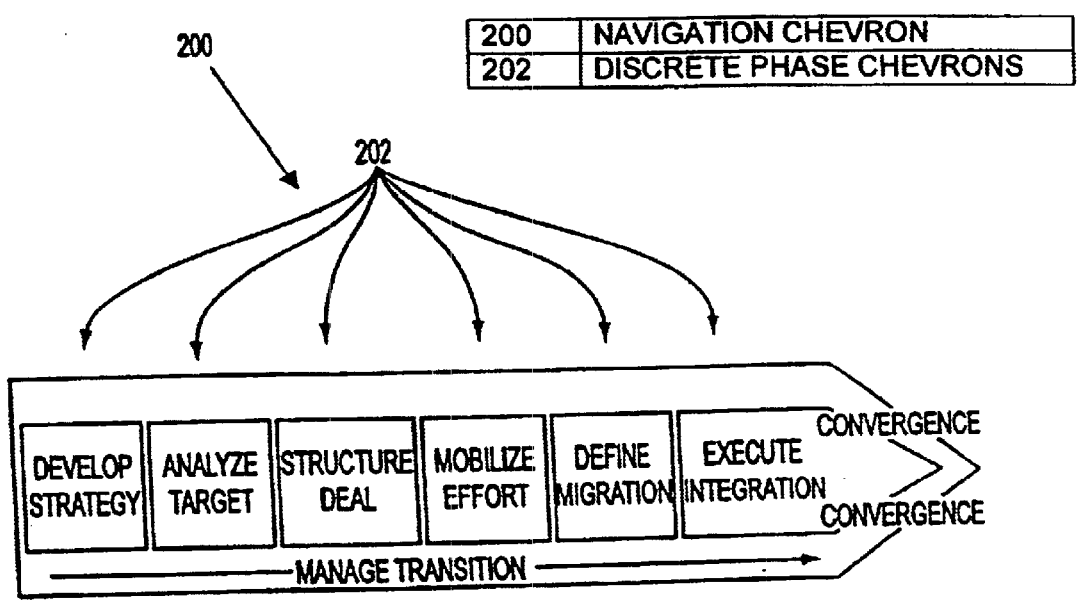
FIG. 2 is an illustration of a Navigation Chevron in accordance with one embodiment of the present invention.

One aspect of the present invention utilizes a unique hypertext feature, a Navigation Chevron 200, to navigate the user through the data in the M&A engine environment. FIG. 2 is an illustration of the Navigation Chevron 200. The Navigation Chevron 200 is generally shaped as an indicia similar to a pointer, and may be arranged in any orientation, such as horizontally, diagonally, or vertically.

The Navigation Chevron 200 is made up of components, or discrete phase chevrons 202, which may be generally shaped similar to the Navigation Chevron 200. Displayed on each discrete phase chevron 202 is an indication of the topic relating to that particular discrete phase chevron 202. The indication may be a color, or some other identifying mark. A preferred indication is the title or general description of the topic area related to the particular discrete phase chevron 202. The description allows the user to easily determine which discrete phase chevron 202 relates to the particular topic needed to complete a particular task.

The Navigation Chevron 200 is used to navigate a database of knowledge utilizing a progression of ideas or phases. Each idea or phase of the knowledge database is represented by a discrete phase chevron 202 in the Navigation Chevron 200. The discrete phase chevrons 202 are organized in a logical progression of the topics covered by the Navigation Chevron's 200 related knowledge database.

The topic pages in the related knowledge database generally include a Navigation Chevron 200 as part of their display. The Navigation Chevron 200 may be located anywhere on the display, preferably away from the data provided by the knowledge database, such as at the top or to the side of the display. In addition, the Navigation Chevron 200 may be of any size. A preferred embodiment uses an initially large Navigation Chevron 200. However, with each subsequent progression, the Navigation Chevron 200 becomes smaller in size.

Figure 3:
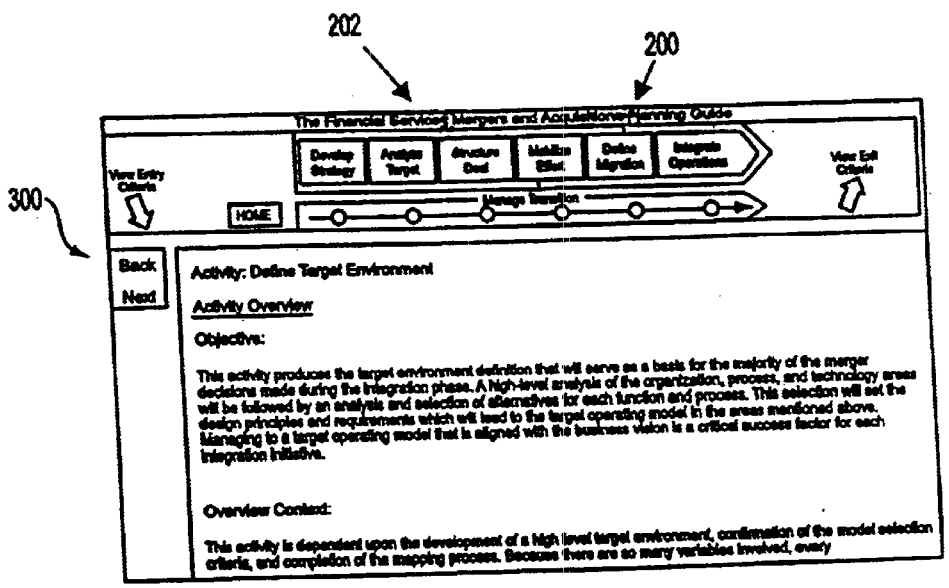
FIG. 3 is an illustration of a knowledge database topic page in accordance with one embodiment of the present invention.

FIG. 3 is an illustration of a knowledge database topic page 300. The knowledge database topic page 300 includes a Navigation Chevron 200 having discrete phase chevrons 202. The discrete phase chevron 202 that is related to the current knowledge database topic page 300 is highlighted.

As the user decides on an area of knowledge to explore, the user picks a discrete phase chevron 202 utilizing a computer input device, such as the mouse 126. Once a discrete phase chevron 202 is chosen, the related knowledge database topic page 300 is displayed along with a Navigation Chevron 200 including a highlighted discrete phase chevron 202 related to the current knowledge database topic page 300. The Navigation Chevron 200 thus allows the user to navigate an extensive knowledge database in an easy and intuitive manner.

The user is able to explore the knowledge database in the order presented on the Navigation Chevron 200, or in an order more pertinent to the task at hand. By selecting the topic to explore in the Navigation Chevron 200 the user can go directly to the topic needed for a particular task. In addition, the Navigation Chevron 200 allows the user to visualize the knowledge database as a whole, and determine how the current knowledge database topic page 300 relates to other topics in the knowledge database. As such, the Navigation Chevron 200 indicates a relationship, i.e. progression or sequence, that is inherently not present in conventional hypertext systems.

Figure 4:
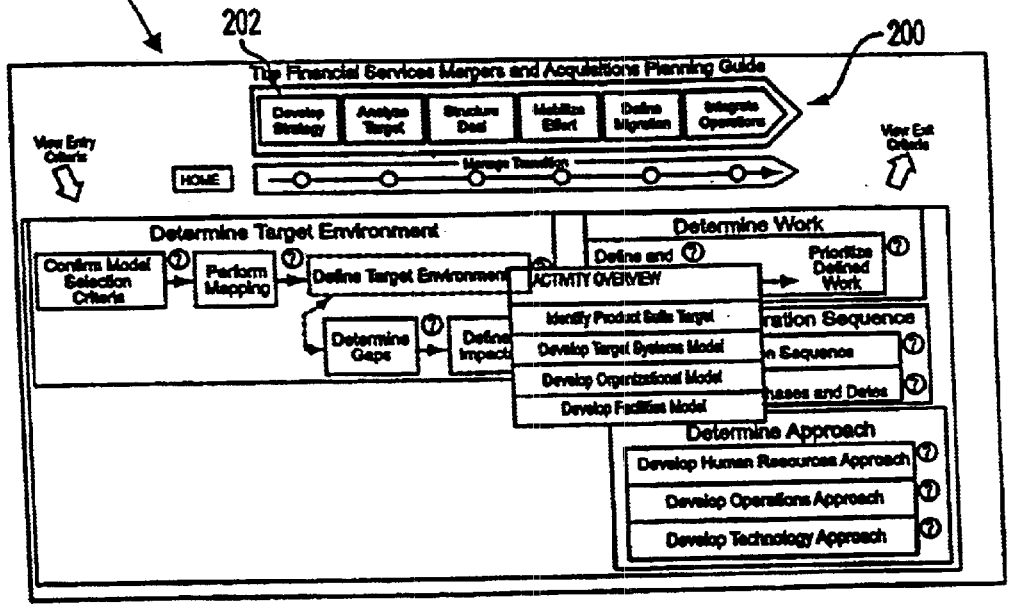
FIG. 4 is an illustration showing the use of Navigation Chevrons in accordance with one embodiment.

Navigation Chevrons 200 may be nested, allowing a more detailed navigation through a knowledge database. FIG. 4 is an illustration showing the use of the Navigation Chevrons in an exemplary graphical user interface 400.

In another embodiment, a large Navigation Chevron 200 may be used to allow access to broad topic areas covered by discrete phase chevrons 202. Each topic covered by a discrete phase chevron 202 may also have a further Navigation Chevron related to the particular broad topic covered by the discrete phase chevron 202. Such Navigation Chevron may further include additional discrete phase chevrons which relate to more detailed information associated with the broad topic of the discrete phase chevron 202. The nesting of Navigation Chevrons 200 may continue, including further nested Navigation Chevrons, as much as needed to allow easier navigation of a large knowledge databases. As discussed above, the nested Navigation Chevrons 200 allow the user to visualize the knowledge database as a whole, and determine how a knowledge database topic page 300 relates to the knowledge database as a whole.

It should be noted that Navigation Chevrons 200 may be employed to navigate data within any type of database including, but not limited to the M&A Engine. Below is an html code segment for displaying and using a Navigation Chevron 200:

```
<tr align="left" valign="top">
    <td><b><img ismap usemap="#ChevronMap4"
    border="0" height="54"
    src="images/MainChevron.gif" width="456"></b></td>
    </tr>
    <map name="ChevronMap4">
        <area shape="poly" coords="347,0,435,1,454,25,435,
        53,347,53,365,28,345,0"href="Post-
        integration.htm">
        <area shape="poly" coords="258,0,343,0,361,27,345,53,
        256,52,271,23,259,0"
        href="Consolid.htm">
        <area shape="poly" coords="171,0,255,0,271,25,253,
        52,173,52,188,26,173,2"
        href="AssessAndStabiliz.htm">
        <area shape="poly" coords="91,0,168,0,186,26,173,
        49,89,52,105,27,89,2"
        href="Organize.htm">
        <area shape="poly" coords="1,0,88,0,101,23,
        88,51,5,51,17,27,3,0"
        href="MergerEng_Main.htm">
</map><map name="MapFeed">
        <area shape="rect" coords="2,0,173,120" href=
        "feedback.htm">
</map>
```

Discussion Database

Bulletin board systems, or BBS's, refer to computer systems equipped with one or more modems or other means of network access that serves as an information and message-passing center for remote users. Often BBS's are focused on special interests, such as science fiction, movies, Windows software, or Macintosh systems, and can have free or fee-based access, or a combination. Users dial into a BBS with their modems and post messages to other BBS users in special areas devoted to a particular topic, in a manner reminiscent to posting notes on a cork bulletin board. Many BBS's also allow users to chat online with other users, send e-mail, download and upload files that include freeware and shareware software, and access the Internet. Many software and hardware companies run proprietary BBS's for customers that includes sales information, technical support, and software upgrades and patches.

In other words, a BBS acts as a storage facility, where people calling from their computers can post or receive messages and send or receive program files. A BBS is usually subdivided by topics so that users with similar interests can send information to other users of similar interests. These related groups of messages are referred to as topics, message areas, forum(s), or conferences, i.e. a particular BBS may contain numerous related groups of messages such as on the subjects of travel, sports, stamp collecting, etc.

BBS's are distinguishable from electronic mail in that BBS's are used for posting messages of a particular group of computer users who have similar interests, but these posted messages are not ordinarily addressed to any particular user. BBS's are also used by some computer users who wish just to read posted messages and other information, without having to post a reply message. For example, a person in Columbus, Ohio, who is preparing for a vacation, may access a BBS on travel through his home computer and post a message asking for the best places to go skiing in the United States. Other network users with an interest in travel may read the message from the person from Columbus, and then reply with their opinion about where the best place is for skiing. There are thousands of BBS's available to computer network users on a wide variety of subject areas.

Figure 5:
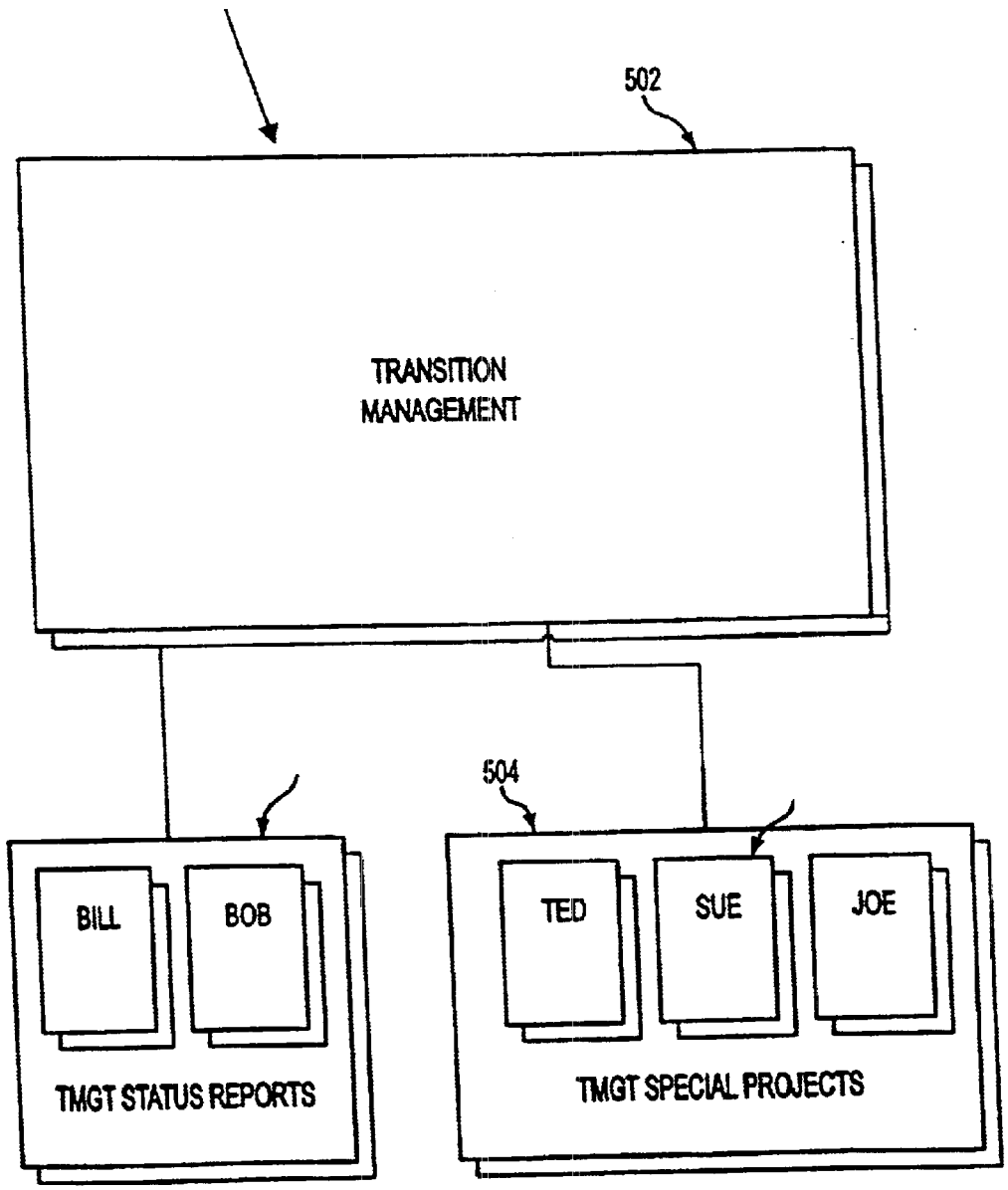
FIG. 5 is a block diagram of a Discussion Database in accordance with one embodiment of the present invention.

Another component of the M&A Engine of the present invention is the Discussion Database. The Discussion Database, in some limited respects, is similar to a BBS in that it is a repository of knowledge on various topics compiled from the input of various users of the Discussion Database. FIG. 5 is a block diagram of a Discussion Database 500 in accordance with one embodiment of the present invention.

A Discussion Database 500 includes a broad topic field 502 having Discussion Groups 504 relating to specific subject areas of the broad topic 502. The Discussion Groups 504 include User Posts 506 which are documents contributed by users of the Discussion Database 500. Preferably, the User Posts 506 are contributed by users of the particular broad topic field 502, and most preferably, the User Posts 506 are contributed by users of the particular discussion group in which the User Post 506 is located. Generally, many broad topic fields 502 are used to create the Discussion Database 500 to increase ease of navigation. Typically, the more broad topic fields 502 that are used to create the Discussion Database 500, the easier it is for a user to find the particular Discussion Group 502 related to the information they need. However, a broad topic field 502 may itself be a Discussion Group 504, and thus contain User Posts 506.

Utilizing the broad topic fields 502, users locate an area of knowledge they need. As discussed above, within each broad topic field 502 are related Discussion Groups 504. The Discussion Groups 504 are further refinements of the broad topic field 502 to which they relate. Users search through a list of Discussion Groups 504 within the broad topic field 502 to determine which Discussion Group 504 most closely relates to the information they need. Once a Discussion Group 504 is found relating to the information needed, the user searches through a list of User Posts 506 located in the chosen Discussion Group 504.

In addition to obtaining information from the User Posts 506 previously located in the Discussion Group 504, users may contribute their own documents to the Discussion Group 504, thereby increasing the knowledge base available in the Discussion Database 500. To contribute documents, users select the document they want to contribute and inform the system utilizing the Discussion Database Interface Page, discussed below. The system then adds the document to the list of available documents contained in the Discussion Group 504 and makes the corresponding document available to other users of the Discussion Database 500.

The Discussion Database 500 is a dynamic continuously growing entity. The more the Discussion Database 500 is used, the more it grows. The Discussion Database 500 as a whole increases as users continue to contribute documents relating to the various Discussion Groups 504. For example, in FIG. 5, Joe decides he needs information about transition management projects on mergers of Nuclear Reactor companies. Joe first searches a list of broad topic fields 502 and determines that the Transition Management topic is the best topic to search in more detail. He then searches through a list of Discussion Groups 504 associated with the Transition Management topic field 502, and determines that TMGT Special Projects Discussion Group 504 is the most closely related to the information he needs. Joe then reads through the User Post 506 contained in the TMGT Special Projects Discussion Group 504 and finds the information he needs. Joe then decides to contribute a document he wrote concerning other TMGT Special Projects, and proceeds to post it to the system. In the end, a user acquired the knowledge he needed, and as a result, the Discussion Database 500 increased its available knowledge base. Thus, it can be seen that the use of a continuously growing knowledge database dramatically increases productivity and organizational knowledge without having to continuously rely on outside sources.

Discussion Database Interface Page

Figure 6:
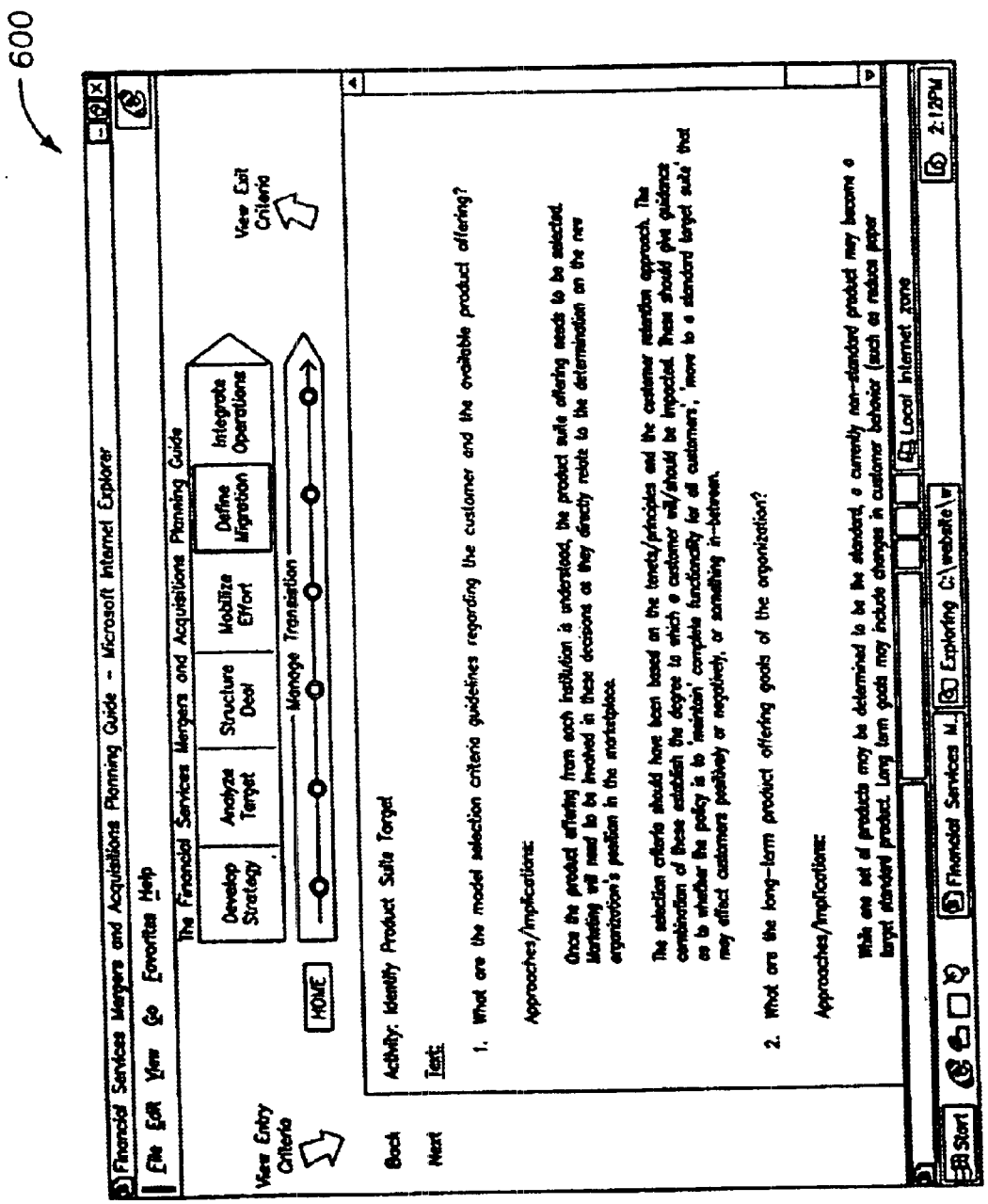
FIG. 6 is an illustration of a Discussion Database Interface Page in accordance with one embodiment of the present invention.

The Discussion Database Interface Page describes the various Discussion Groups which are available to the user of the M&A Engine of the present invention. The Discussion Database Interface Page also subscribes the user to the individual Discussion Groups 504 used most often by the user. FIG. 6 is an illustration of a Discussion Database Interface Page 600.

In one embodiment, the Discussion Database Interface Page 600 may include a Discussion Group List having a list of broad topic fields 502 and Discussion Groups 504. As discussed above, a broad topic field 502 may itself be a Discussion Group 504.

Each Discussion Group 504 may have a Description associated with it. Each Description includes a string of descriptive data, or summary, of what type of information is contained in the related Discussion Group 504. The Description is preferably kept short to decrease the overall size of the Discussion Group List. However, the Description may be as long as needed to adequately inform users as to the contents of a particular Discussion Group 504.

By describing the categories of information within the Discussion Groups 504, a user may effectively select the categories on the Discussion Database Interface Page which are most relevant. As an option, the aforementioned string of descriptive data may constitute a link to the data. Also, a user may subscribe and access the categories of data by executing only one user action, namely clicking on the appropriate Discussion Groups 504 on the Discussion Database Interface Page 600.

As such, the Discussion Database Interface Page 600 is utilized by the user to subscribe to and access individual Discussion Groups 504. When a user wishes to join a Discussion Group 504, the user selects the appropriate Discussion Group 504 from the Discussion Group List. The corresponding Discussion Group 504 is then added to the Discussion Groups 504 the user can utilize. By subscribing only to Discussion Groups 504 pertinent to the particular user's interest and needs, the user can more quickly obtain needed information. Since the number of Discussion Groups 504 subscribed to by a particular user is generally much less than the total number of Discussion Groups 504 available, the user does not need to search through a large list of Discussion Groups 504 every time he or she needs information. Instead, the user selects only those Discussion Groups 504 that he or she will need most often. Thereafter, when the user desires information, he or she will generally only need to search through the Discussion Groups 504 the user has subscribed to. Thus, the search time is drastically reduced after the first use of the system.

The use of the Discussion Database 500 in combination with the Discussion Database Interface Page 600 creates a wealth of information useful for the entire organization utilizing the system. The Discussion Database 500 contains not only information provided by the organization that sets up the Discussion Database 500, but also information provided by users of the system. The Discussion Database coupled with the Discussion Database Interface Page 600 creates a "living library" which grows with each use, and grows with the knowledge of its users. As users acquire more knowledge from experience and other outside sources, they transfer that knowledge to the Discussion Database 500 utilizing the Discussion Database Interface Page 600. The transfer of knowledge to the Discussion Database 500 increases the knowledge contained in the Discussion Database 500, and helps keep the information contained in the Discussion Database 500 updated as new developments arise in various fields.

It should be noted that the Discussion Database Interface Page 600 may be employed to provide effective access to any type of database including, but not limited to, the database associated with the M&A Engine.

Figure 7:
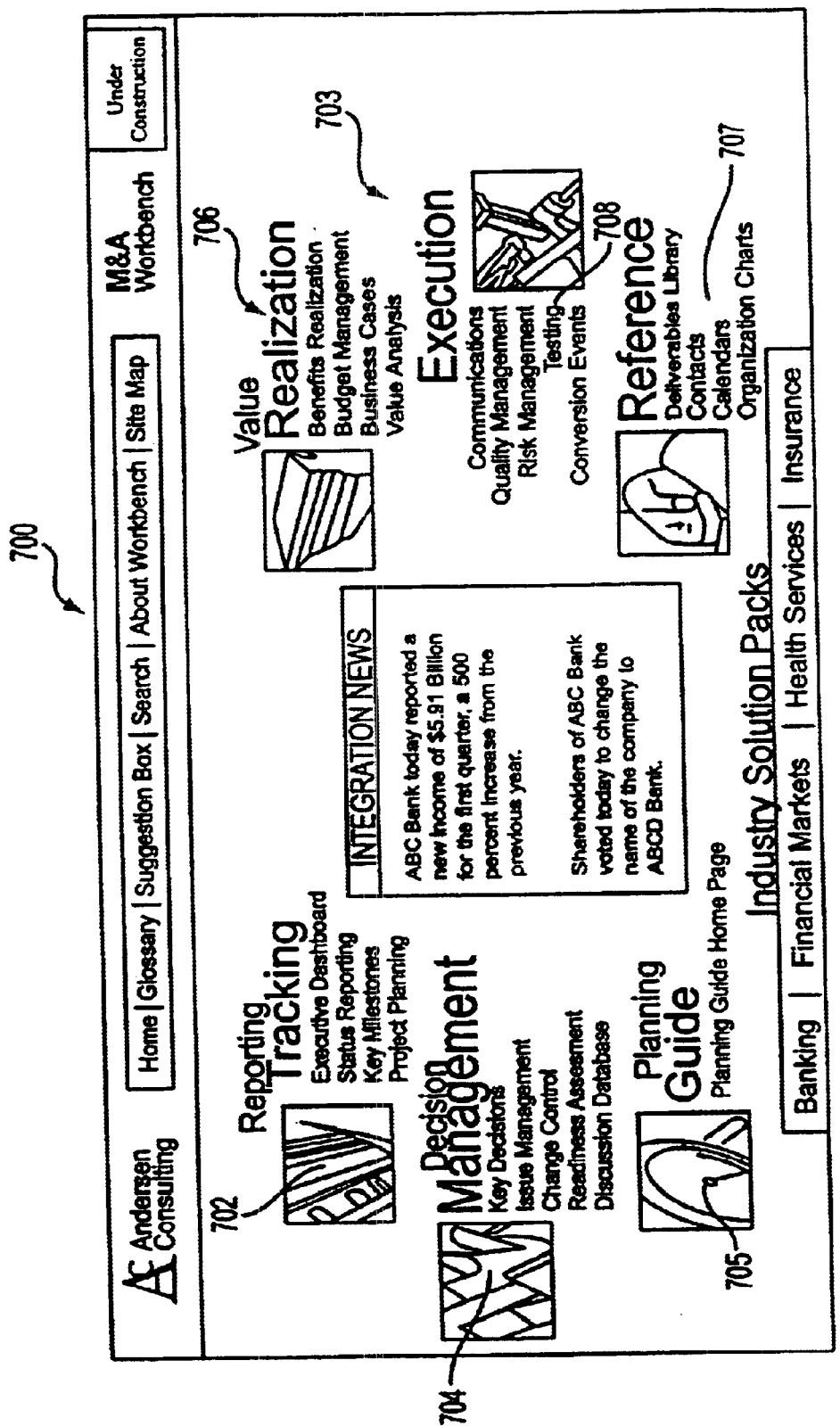
FIG. 7 is a "home"-page of one embodiment of the web-based tool of the present invention.
Figure 7A:
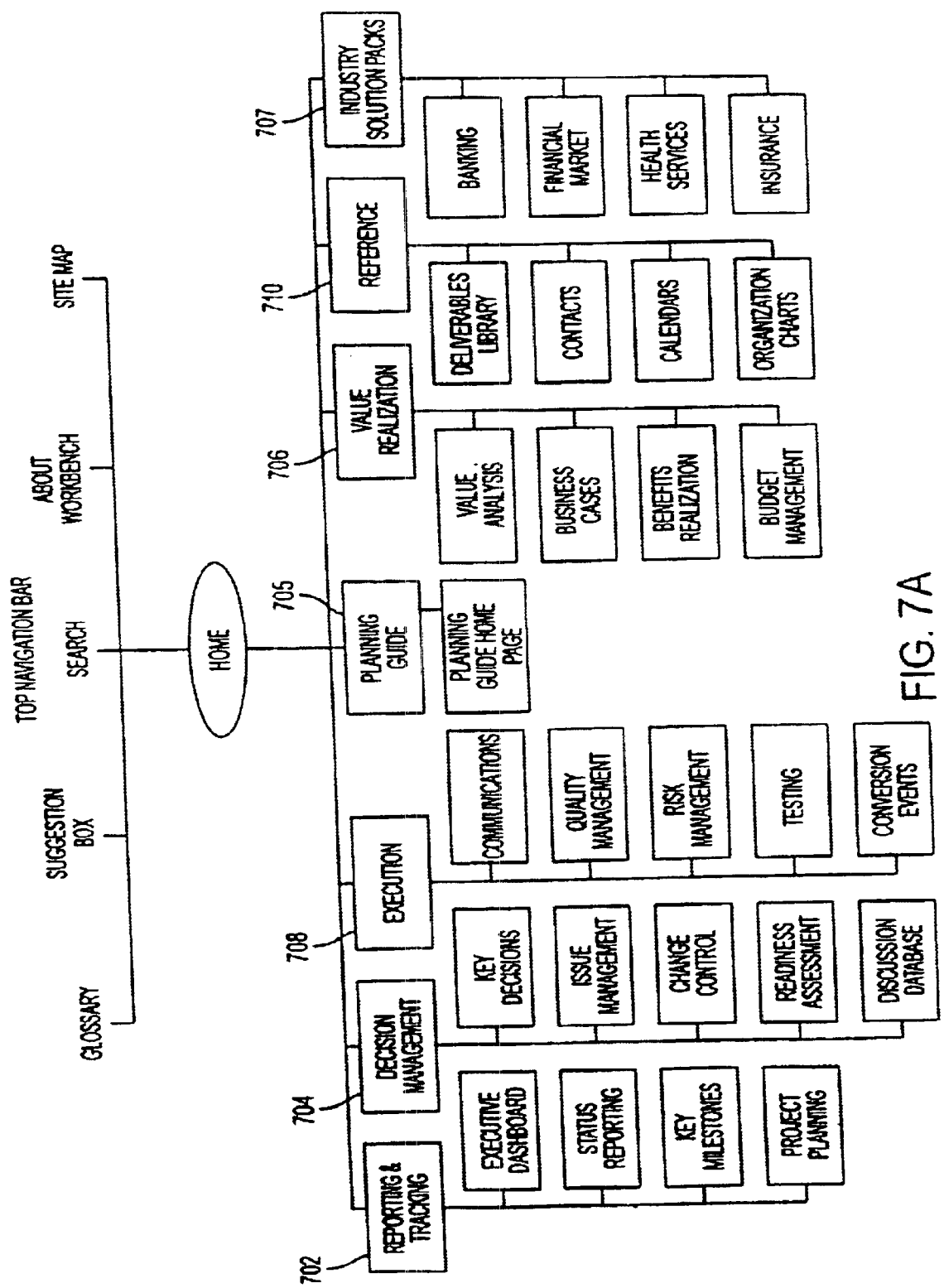
FIG. 7A is a site map of one embodiment of the web-based tool of the present invention.

One embodiment of the present invention is thus a web-based tool for use by clients to provide a central source for executing project management tasks, understanding industry specific solutions, and accessing a planning guide. FIG. 7 is a "home"-page of one embodiment of the web-based tool of the present invention. As shown, various categories of project management tools 703, a planning guide 705, and industry solution packs 707 relating to a merger and acquisition may be retrieved from a single interface 700. Such management tools include a reporting and tracking tool 702, decision management tool 704, value realization information 706, execution tool 708, and reference tool 710. FIG. 7A is a site map of one embodiment of the web-based tool of the present invention.

The Project Management Tools allow users to access templates, create, store and retrieve documents and generate reports. These tools are separated into five categories.
Tools
Reporting and Tracking The reporting and tracking tool 702 ensures that the M&A effort is being planned properly and that progress is being effectively monitored. There are multiple Reporting and Tracking functions, namely an executive dashboard, status reporting, key milestones, and project planning.

Figure 8:
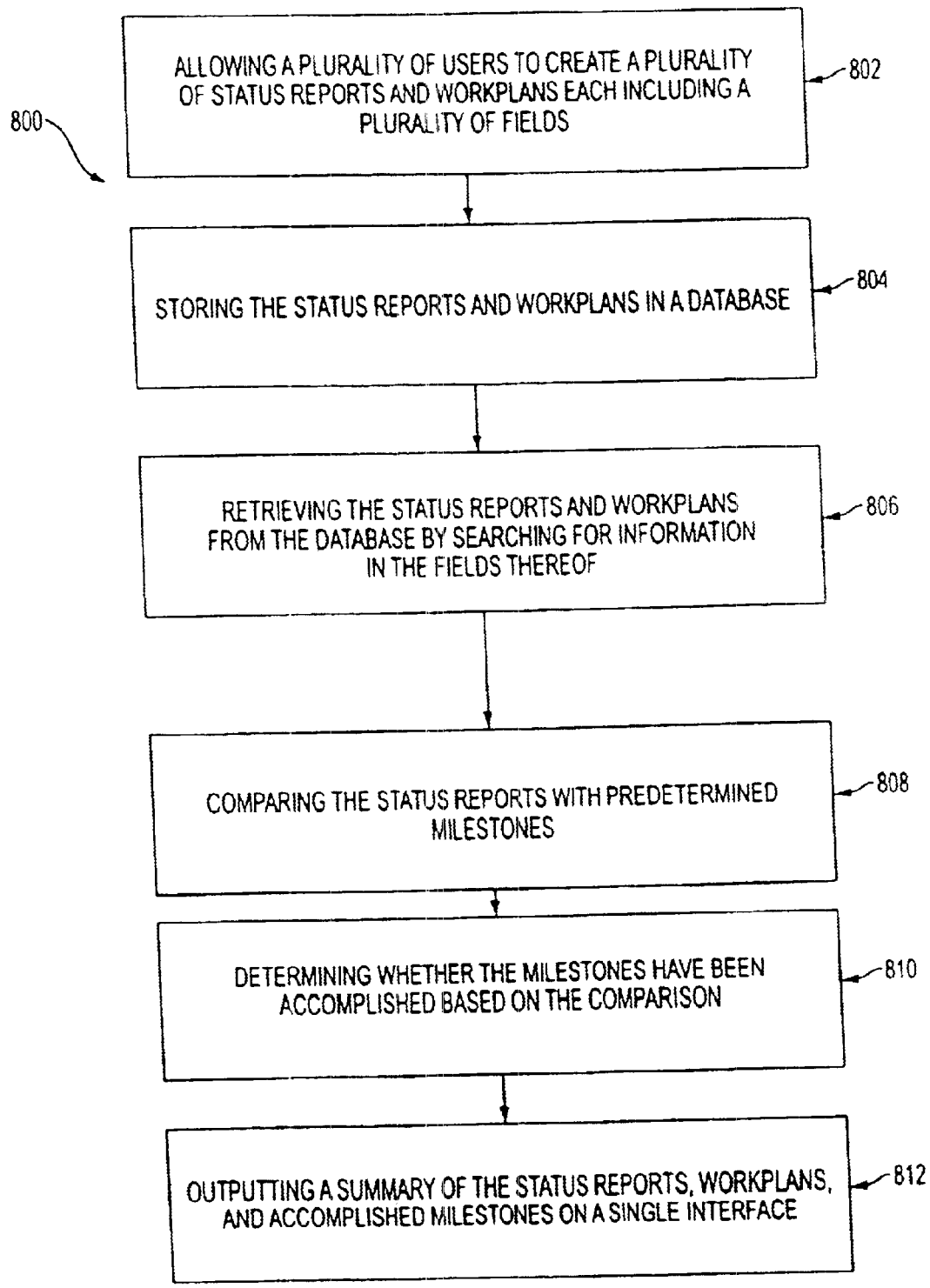
FIG. 8 is a flow chart illustrating some of the functions that may be associated with the reporting and tracking tools of the present invention.

FIG. 8 illustrates some of the functions that may be associated with the reporting and tracking tools of the present invention. More specifically, FIG. 8 sets forth a method 800 for reporting and tracking on the progress of a process, such as a merger, an acquisition, foreclosure proceeding, etc. In operation 802, a plurality of users are allowed to create a plurality of status reports and workplans each including a plurality of fields. For example, one of the fields could include a name of a user. The status reports and workplans are stored in a database in operation 804 and are retrieved from the database in operation 806 by searching for information in the fields of the status reports and workplans. In operation 808, the status reports are compared with predetermined milestones to make a determination in operation 810 as to whether the milestones have been accomplished. A summary of the status reports, workplans, and accomplished milestones may be outputted on a single interface or on multiple interfaces in operation 812.

Optionally, a preview of the item may be displayed after its creation and prior to it being stored. As another option, the accomplished milestones may be graphically outputted. The milestones may also be outputted in terms of time. In a further aspect of the present invention, the status reports may relate to projects such as customers, customer service, employees, financials, and technology.

The various elements of the reporting and tracking tool will now be set forth.
Executive Dashboard Provides interested parties a single checkpoint area to understand the current state of the merger. Executives must be able to identify and track realized benefits as well as issues securely and quickly. The Executive Dashboard is a consolidated tool that provides a means for executives to access key information in a quick and illustrated manner. For Release I the Executive Dashboard may include two or more categories including a Merger Integration Balanced Scorecard and a Progress/Status Report.

Figure 8A:
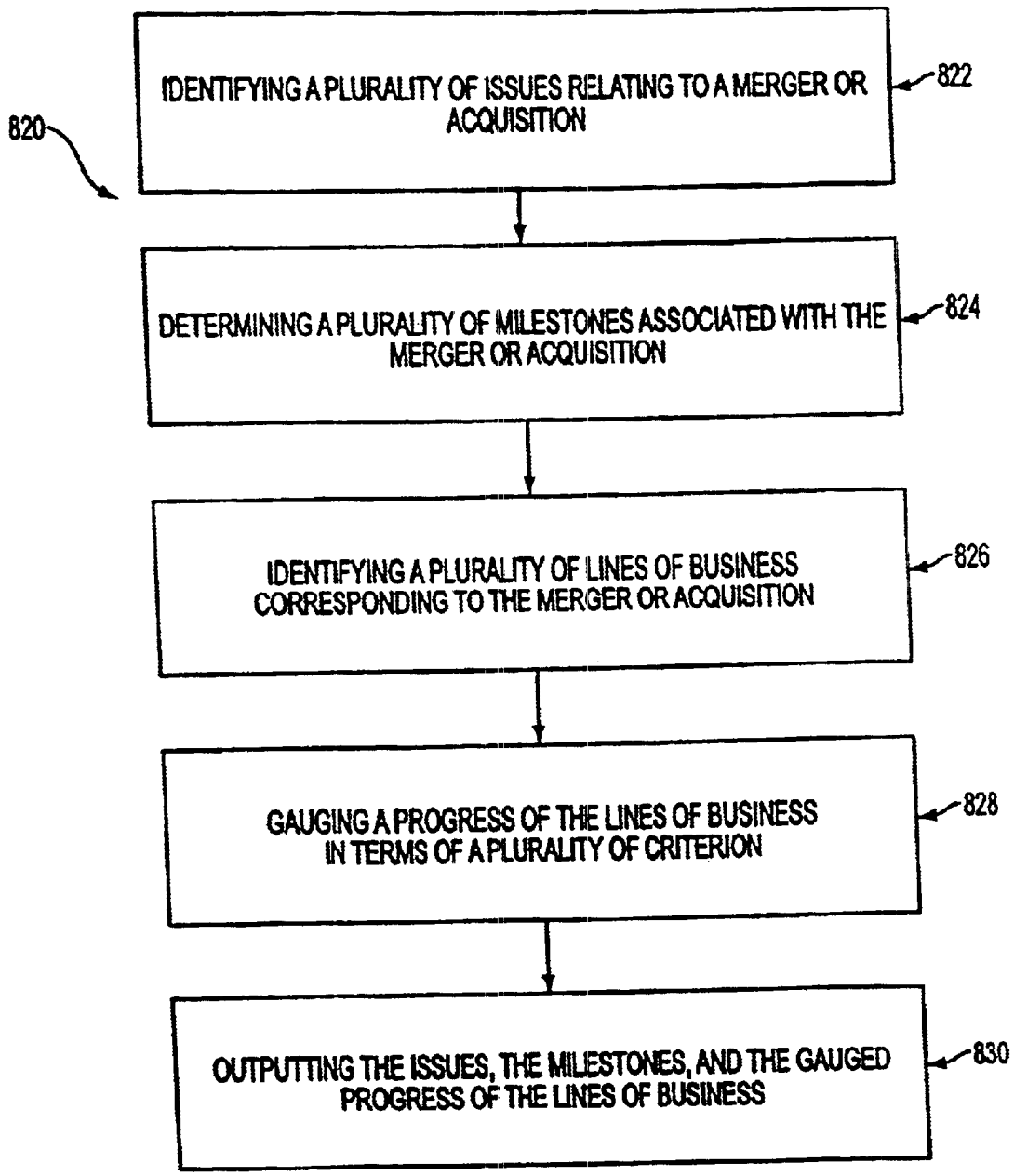
FIG. 8A is a flow diagram that illustrates some of the functions associated with the executive dashboard tool of the present invention.

FIG. 8A illustrates some of the functions associated with the executive dashboard tool of the present invention. In particular, FIG. 8A depicts a method 820 for providing a summary of data relating to a merger or acquisition via an interface to a database. In operation 822, a plurality of issues relating to a merger or acquisition are identified. A plurality of milestones associated with the merger or acquisition are determined in operation 824 and, in operation 826, a plurality of projects corresponding to the merger or acquisition are identified. In operation 828, progress of the projects is gauged in terms of a plurality of criterion and the issues, the milestones, and the gauged progress of the projects are outputted in operation 830, such as via depiction in a graph or chart.

As an option, the milestones may be differentiated in terms of being planned and made. As a further option, the issues may be differentiated in terms of being open, late, and resolved.

In another aspect of the present invention, the projects may include customers, customer service, employees, financials, and technology. In a further aspect of the present invention, the criteria may include not started, on schedule, behind schedule, at risk, not applicable, and complete.

The first topic the Merger Integration Balanced Scorecard can include is an Issue Resolution section. This will provide executives with an opportunity to review information on open, resolved, and executive attention issues. Secondly, the Scorecard will include an update of Key Milestones, including: the total number of Planned Milestones as well as the number of Made Milestones.

The Progress/Status section looks at 5 projects including: Customer, Customer Service, Employee, Financials and Technology. Each Line of Business is "scored" in 6 different areas (Define Requirements, Design, Development, System Test, Integrated Test and Mock Conversion ). Scores include Not Started (black), On Schedule (green), Behind Schedule (yellow), At Risk (red), Not Applicable (black) and Complete (a grayed out field).

The Executive Dashboard program will exhibit basic functionality. Since the user is not required to input any data, there are no required fields. However, listed below are the field names that will appear on the page. Most of the fields on the Executive Dashboard page are static. Those fields that are marked with an asterisk. These fields are 'integer' fields. They will display a number generated by the program.

Customer
Customer_Service
Employees
Financials
Technology
Requirements_Definition
Design
Development
System_Test
Integrated_Test
Mock_Conversion
Scoring_Key
Not_Started
On_Schedule
At_Risk
Behind_Scheduled
Complete
Not Applicable
Total_Issues*
%_Open*
%_High_Open*
%_Resolved*
%_Late*
Total_Milestones*
Planned*
Made*

The various technical requirements are as follows:

A www browser; must be Microsoft Internet Explorer 4 or Netscape™ 4.0
A web server that supports CGI programs
ODBC version 2.0 or higher
An ODBC compliant database
Perl 5

The Executive Dashboard program does not require data input by the user. A Perl script will be executed, performing a series of queries by accessing the database. Aggregate function will be built into the Issue Resolution query in order to obtain %_Open, %_High_Open, and %_Resolved and %_Late. A returned Search Result will display all requested information as seen in the screen shot below.

Figure 9:
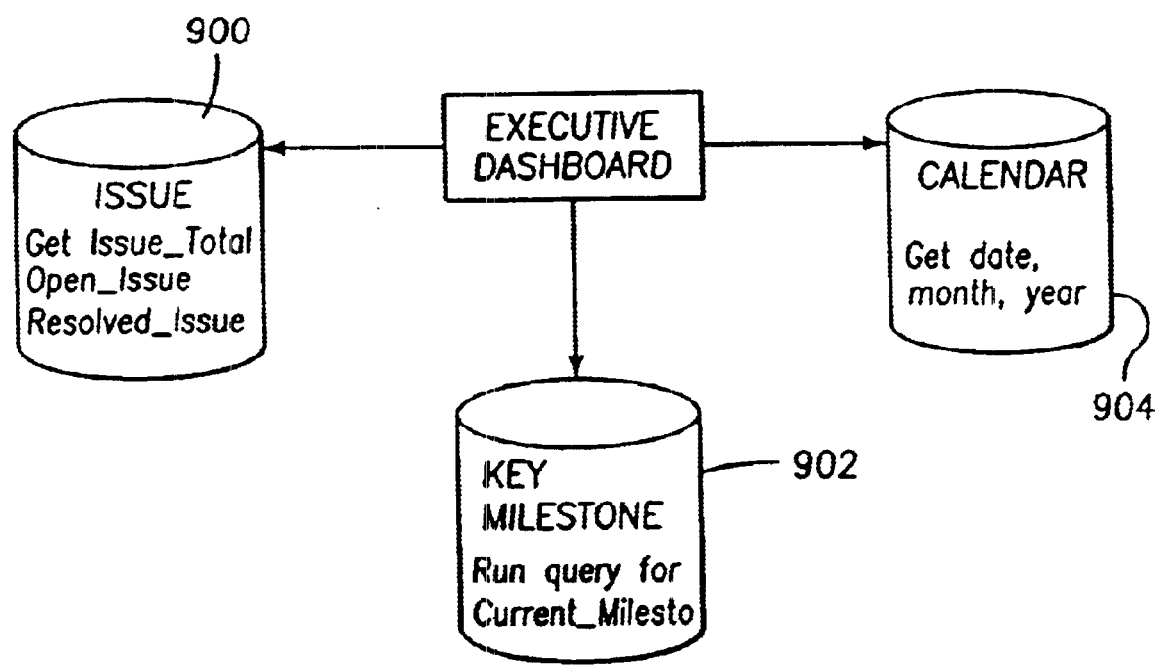
FIG. 9 illustrates various workbench access database tables that are relevant for the Executive Dashboard.

FIG. 9 illustrates various workbench access database tables that are relevant for the Executive Dashboard. Such tables include the ISSUES table 900, KEY MILESTONES table 902 as well as the CALENDAR table 904. All tables are stored in an ODBC compliant database.

Figure 10:
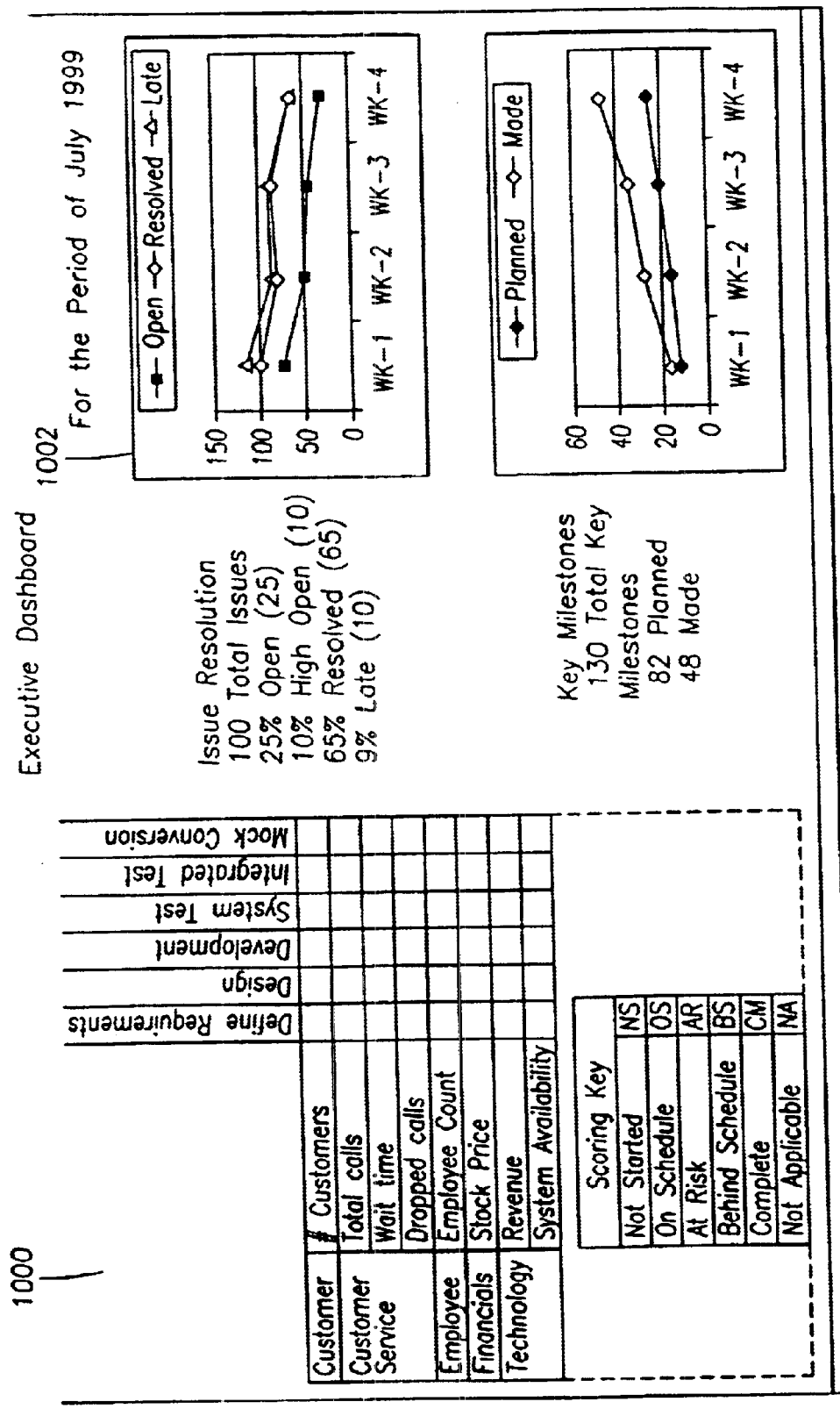
FIG. 10 is a chart depicting a display of the executive dashboard.

FIG. 10 illustrates an example of what users will view as the executive dashboard. As shown, the various information is displayed in the form of graphs 1000 and charts 1002.

The Executive Dashboard is a report in and of itself. It provides executives with detailed information regarding Issue Resolution and Key Milestones going on in the merger/acquisition as well as information regarding the company, its financials, customers, employees and technology.

Status Reporting

The Status Reporting function allows users to create and track status reports on the progress of a process for themselves, others and teams within the Workbench.

The Status Reporting application provides 3 basic areas of functionality:

Create Status Report—recognizing team leaders and parent teams
Searching Status Report
Help with Status Report Each screen that is related to these areas of functionality contains the following buttons:

TABLE 1

| Button Name | Description |
| --- | --- |
| Create | The CREATE Status Report screen is displayed |
| Search | The SEARCH Status Reports screen is displayed |
| Help | Provides instructions for the area of functionality that the user is in. |

The main screen serves as an entry point to the Status Reporting function. The Main Screen will list the records of the current Status Reports within the Workbench sorted by Period Ending. The Main Screen should be populated with high level data regarding the Status Reporting entries. The data is stored in an Access database and retrieved using CGI scripts.

The results will be broken into groups of 10 results at a time. If more than 10 results exist, a link to the "Next 10" records will be displayed on the bottom right hand corner of the results set. If the user proceeds to the next 10 results a link to move back to the Previous 10 will activate on the bottom left hand corner of the display.

The display includes the following information:

TABLE 2

| Field Name | Format | Description |
| --- | --- | --- |
| Owner | First Last Name | The person who created the Status Report. The name will serve as a link to the details of the specific Status Report. |
| Team | Team Name | The name of the Team the report is referencing. |
| Period Ending | mm-dd-yyyy | The Ending date of the period being reported |

From the Main Screen, each Status Report displayed is linked to the details of the respective Status Report through the Owner column. By clicking on an entry, the Display Screen is shown. This screen will display the entire Status Report.

The Status Report will display each field used within a Status Report and the values for the particular Status Report. None of the fields are editable in this screen. The following lists all the fields, their formats and a description:

TABLE 3

| Field Name | Format | Description |
| --- | --- | --- |
| Owner | First Last Name | Person Status Report is regarding. |
| Team | Team Name | Read from Access database. |
| Event | Event Name | Read from Access database. |
| Area | Area Name | Read from Access database. |

TABLE 3-continued

| Field Name | Format | Description |
| --- | --- | --- |
| Period Beginning | mm-dd-yyyy | Displayed as year-month-day |
| Period Ending | mm-dd-yyyy | Sorted by descending order. |
| Accomplishments | Each item is its own bullet | Shown in Bullet style |
| Goals | Each item is its own bullet | Shown in Bullet style |
| Issues/Risks/Concerns | Each item is its own bullet | Shown in Bullet style |
| Comments | Continual text | Shown in Paragraph format. |

From the display screen, the user is given three new navigational options. First the user can click "Back" to return to the Main Screen display. This should take them back to the exact set of 10 results the came from. Meaning, if there are more than 10 Status Reports listed and they clicked Next 10 to move to the next set and selected a Status Report from that list, when they click "Back" from the Display Screen they are returned to the second set of 10 and not the beginning of the list.

Secondly, the user can click "Print" which will bring up the browser's print dialog box in order to print the Status Report.

And finally, the use can click "Edit." By doing this, the user is sent to a new page that contains all of the fields seen in the Display Screen but with many of them editable. The following fields are editable:

TABLE 4

| Field | Description |
| --- | --- |
| Accomplishments | Individual accomplishments will be displayed in text fields. These fields are editable. There will also be 5 empty text fields so the user can add new accomplishments. The user should be able to edit, move around, add more, or delete any of these fields. If a field is left blank, it will not be stored. If a field is left blank between two filled fields, the program should recognize this and skip the blank field and move on to the completed fields. |
| Goals | Individual Goals will be displayed in text fields. These fields are editable. There will also be 5 empty text fields so the user can add new goals. The user should be able to edit, move around, add more, or delete any of these fields. If a field is left blank, it will not be stored. If a field is left blank between two filled fields, the program should recognize this and skip the blank field and move on to the completed fields. |
| Issues/Risks/Concerns | Individual issues/risks/concerns will be displayed in text fields. These fields are editable. There will also be 5 empty text fields so the user can add new issues/risks/concerns. The user should be able to edit, move around, add more, or delete any of these fields. If a field is left blank, it will not be stored. If a field is left blank between two filled fields, the program should recognize this and skip the blank field and move on to the completed fields. |

From this screen the user can:

1. Edit the existing Status Report and click "Preview" to move on. This screen and its functionality will be discussed in the next section on the "Create Screen."
2. Click "Back" to go back to the display of the Status Report and not edit anything.

Another area of functionality allows the user to create a Status Report using the Workbench which stores the data in the Workbench database and is retrievable from the Status Reporting function and the Deliverables Library.

The user must provide data into the required fields and is given optional fields for certain information. If one of the required fields is not completed, the user will be prompted to include the data in to the missing required fields. The error message will list the field(s) missed and provide a link for the user to return and complete those fields. The only field that is not required on the first create screen shown below is the 'Submitted By" field. This field should be used if a third party is submitting a Status Report on behalf of somebody else.

After a user has successfully completed a status report, they will see a preview of the status report. From the preview screen, the user can: 1. Go back and edit the report or 2. Save the Status Report in the database. Note that a user can always return at a future date/time to edit the status report as described above.

The create function is separated into 2 main screens. The first screen requires the following fields:

TABLE 5

Screen 1

| Field Name | Field Type | Description |
| --- | --- | --- |
| Name | Drop down list | Required |
| Team | Drop down list | Required |
| Event | Drop down list | Required |
| Area | Drop down list | Required |
| Period Beginning | 3 Drop Downs (Mo., Day, Yr.) | Required |
| Period Ending | 3 Drop Downs (Mo., Day, Yr.) | Required |
| Submitted By: | Text Field | Optional |

Once all fields have been validated one of four screens will be displayed based on the user's inputs:

1. If the User is creating his/her first status report. A Screen with the fields in Table 6 below will display allowing 5 empty input boxes for each item. The Name, team and dates will also displayed without editing privileges. There will also be the ability to add more fields for any of the listed areas by entering a number in the appropriate box and selecting the link.
2. If the User has an existing Status Report for the Specific Team, the program will automatically grab the User's Goals from the last period and put them into the Accomplishments for the Status Report being made The user does not have to keep the automatically generated accomplishments. He or can add more, edit the existing ones, or remove the existing ones. The program will also bring forward the user's issues from the last period into the Issues/Risks/Concerns fields. As with the carried over accomplishments the user can add more, edit the existing ones or delete the existing ones. The Goals and Comments fields will be empty and can be completed by the user.
3. If the user is a team leader, the program will automatically grab the Accomplishments, Goals, and Issues/Risks/Concerns from all of his/her team members for the period in question and populate the fields with those values. The Comments field will be blank.
4. If the User is a team leader of a team that has children teams (see Discussion on Access Database), the program will automatically grab the Accomplishments, Goals, and Issues/Risks/Concerns from the status reports of the team leaders for each respective Child team. The Comments field will be blank.

For all the possible directions certain rules apply:

1. None of the editable fields are required (remember that Name, Team, Event, Area, Period Beginning, Period Ending & Submitted By are not editable on this screen).

2. Empty fields can be within completed fields. That is, not all of the available field, for example in the Accomplishments field set, need to be completed and if one of them is empty and in between two completed fields, the program should recognize this and move the ones below it up once it is submitted. This works the same way with Goals and Issues/Risks/Concerns.

3. Any alphanumeric character should be able to be used within these fields.

TABLE 6

Create Screen Fields 2

| Field Name | Field Type | Description |
|---|---|---|
| Accomplishments | Text Box | Optional |
| Add Tasks | Text Box - default "0" | Optional |
| Goals | Text Box | Optional |
| Add Goal | Text Box - default "0" | Optional |
| Issues/Risks/Concerns | Text box | Optional |
| Add Issues/Risks/Concerns | Text Box - default "0" | Optional |
| Comments | Text Area | Optional |

When the user completes all the fields, the user can click "Preview." By doing this, the user is shown exactly what his/her Status Report looks like and will look like when displayed in the Display Screen.

From the Preview screen, the user will see all the inputs entered in non editable text. The Accomplishments, Goals and Issues/Risks/Concerns will be displayed in a Bullet format.

If the user finds a mistake or wants to make any changes (whether it is an edit or adding/deleting an Accomplishment, Goal or Issue/Risk/Concern) they can in this way and when satisfied click "Preview" again.

Once satisfied with the Preview, the user would click "Save Report." By saving the report, the new Status Report is inserted into the appropriate tables in the Workbench Database and the user is returned a confirmation dialog box thanking them for their submission and is redirected to the Main Screen.

Search Function

Figure 10A:
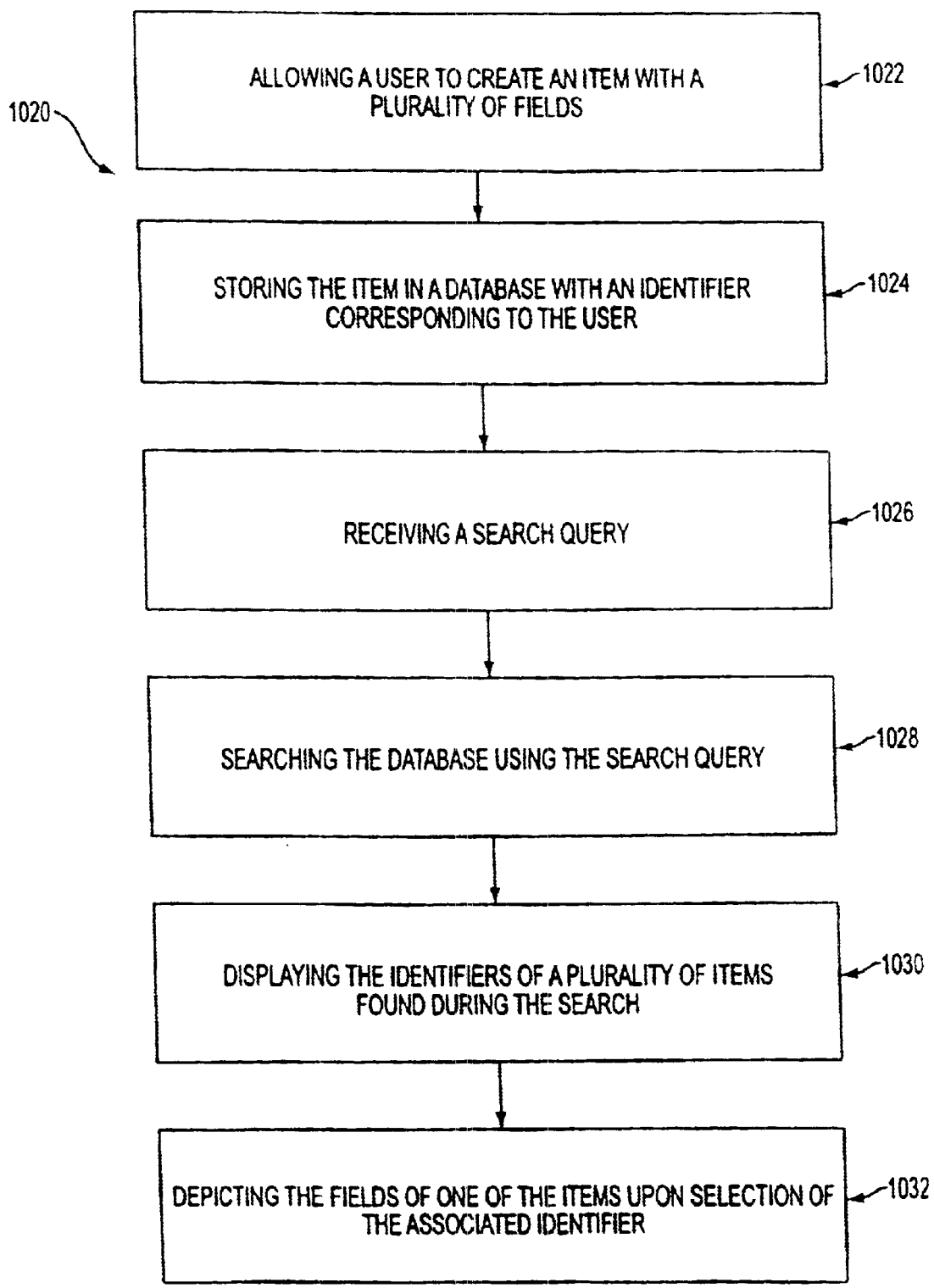
FIG. 10A is a flow chard depicting an embodiment of the present invention which provides a method for querying a database which is storing a plurality of items generated by multiple users.

Another area of functionality allows the user to search for one or more Status Reports in the Workbench database using a specified search criteria. FIG. 10A depicts an embodiment of the present invention which provides a method 1020 for querying a database which is storing a plurality of items generated by multiple users. In operation 1022, users are allowed to create an item with a plurality of fields. The item is stored in a database in operation 1024. The item should be stored with an identifier corresponding to the user. Upon receipt of a search query in operation 1026, the database is searched in operation 1028 using the search query. In operation 1030, the identifiers of a plurality of items found during the search are displayed. Upon selection of the associated identifier of one of the items, the fields of that item are depicted in operation 1032.

In an aspect of the present invention, the item may include a report, a milestone, an issue, and/or a project plan. Optionally, the item may also include information on a merger or acquisition. In another aspect of the present invention, the identifier corresponding to the user may include a name of the user, a team on which the user works, and/or a time a period is to end.

In an embodiment of the present invention, a user may be allowed to edit a predetermined set of the fields upon depicting the same in response to the selection of the associated identifier. In a further embodiment of the present invention, a preview of the item may be displayed after the creation thereof and prior to the storing thereof. In an additional embodiment of the present invention, a report may be generated that includes a predetermined number of the fields of the items corresponding to the depicted identifiers in response to a user action.

If the user conducts a search with no search criteria, all of the Status Reports in the database will be listed displaying 10 at a time, for example. If no Status Reports are found that match the search criteria, a screen will appear stating that no results were found and a link returning them to the Search Screen will be present.

The user can use one or more of the following fields for their search:

TABLE 7

Search Status Reports Fields

| Field Name | Field Type | Description |
|---|---|---|
| Name | Drop down list | Optional |
| Team | Drop down list | Optional |
| Event | Drop down list | Optional |
| Area | Drop down list | Optional |
| Period Ending From | 3 Drop Down Fields | Optional |
| Period Ending To | 3 Drop Down Fields | Optional |

A successful search will display the results in a table format. These results will be displayed in descending order by using the Period Ending Date. The search results screen will display a set of 10 results. If more than 10 results are found, each result screen will link to the next set of 10 results.

The following fields may be displayed on the results screen table:

TABLE 8

| Field Name | Format | Description |
|---|---|---|
| Owner | First Last Name | Link to display status report. |
| Team | Team Name | Read from Access database. |
| Period Ending | mm-dd-yyyy | Sorted by descending order. |

From this screen the user can:

1. Click "Edit Search Criteria" to return to the main search screen to edit the search criteria.

2. Click "Generate Detail Report" to create a report of all the Status Reports that met the search criteria.

3. Click "Generate Summary Report" to create a report that displays a listing of all status reports that met the search criteria.

4. Click on an Owner to see the specific Status Report.

The edit search criteria option returns the user to the search criteria to edit the fields or values being searched.

The generate detail report is yet another area of functionality allows the user to generate a Detail Report of all status reports obtained from the search. Detail Reports will display the complete Status Report of every result found in the search separating each one with a Horizontal Rule. The user will have a choice to "Print" the detailed report or go "Back" to the search results. The fields within the Detail Report are listed below.

TABLE 9

| Field Name | Format |
| --- | --- |
| Owner | First Last Name |
| Team | Team Name |
| Event | Event Name |
| Area | Area Name |
| Period Beginning | mm-dd-yyyy |
| Period Ending | mm-dd-yyyy |
| Accomplishments | Listed with Bullets |
| Goals | Listed with Bullets |
| Issues/Risks/Concerns | Listed with Bullets |
| Comments | In Paragraph form |

Summary Reports are created by clicking on the "Generate Summary Report" on the Search Results screen. The user will be able to print the report by clicking "Print" or return to the Search Results by clicking "Back". The Summary report will resemble the initial Search Results screen and the Main Screen but will not limit the number of records shown to 10 and will contain one extra field. The fields within the Summary Report are listed below:

TABLE 10

| Field Name | Format |
| --- | --- |
| Owner | First Last name |
| Team | Team Name |
| Period Beginning | mm-dd-yyyy |
| Period Ending | mm-dd-yyyy |

The Help screen is meant to provide basic help on the Status Reporting function.

The Help Screen contains three areas:
1. About Status Reporting: a brief explanation of how Status Reporting applies to the M & A Effort.
2. About The Template: A listing and description of all the fields the user uses to complete a Status Report.
3. Navigation: A List and description of all the possible navigational routes possible within Status Reporting. This will contain a listing of all the buttons or links and their results.

The Status Reporting application has the following technical requirements for a target machine:

ODBC version 2.0 and higher
An ODBC compliant database such as Microsoft Access, Microsoft SQL Server, or IBM DB 2
A Web server that supports CGI programs
Perl 5
A www browser no earlier than Microsoft Internet Explorer 4 or Netscape™ 4.0

Status Reporting is composed of three modules. These modules are named Create, Search, and Help. All of the Status Reports are stored in the Workbench database within 3 tables. The fields that allow only one entry (StatusID, Owner, Team, Period Beginning, Period Ending, & Comments) are within the tblStatus_Report table with the StatusID being automatically generated). The Goals & Accomplishments are stored within the tblStatus_Tasks table (Each one is assigned a TaskID and is given a "1" or "4" to differentiate between Accomplishments and Goals respectively).

Figure 11:
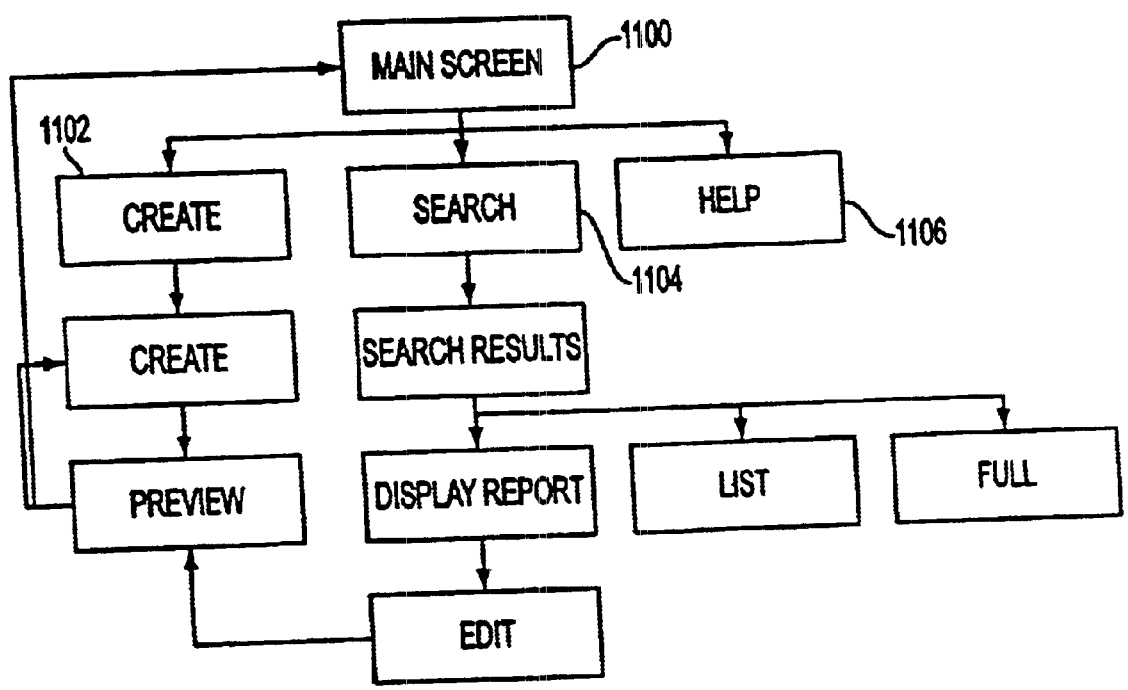
FIG. 11 is a diagram that depicts the basic flow of navigation throughout the application's screens.

All tables are stored within an ODBC compliant database. The five modules and their relationship to the issues and comments table is shown below:

It should also be noted that the input forms for the CREATE, SEARCH and UPDATE modules are generated by a module that will extract data from the tblMembers table and the tblMergerTeam tables from within the database FIG. 11 is a diagram that depicts the basic flow of navigation throughout the application's screens. The first screen in the Status Reporting application is the Main screen 1100. This screen presents the user with a list of all the Status Reports sorted by most recently ending. The user is able to go to CREATE 1102, SEARCH 1104, and HELP 1106 from any of the pages within the application.

The Status Reporting application will create Status Reports. It will also have the capability to generate reports of Status Reports.

Key Milestones

The Key Milestones function allows users to create and track key milestones related to the M & A Effort.

The Key Milestones application will provide six basic areas of functionality:

Create Key Milestones—recognizing team leaders and parent teams
Searching Key Milestones
Displaying Key Milestones
Editing & Appending existing Key Milestones
Generating a Full Report of Key Milestones
Generating a List Report of Key Milestones Each screen that is related to these areas of functionality will contain the following buttons:

TABLE 11

| Button Name | Description |
| --- | --- |
| Create | The CREATE Key Milestones screen is displayed |
| Search | The SEARCH Key Milestones screen is displayed |
| Help | Provides instructions for the area of functionality that the user is in. |

The areas of functionality are described below:

The first area of functionality allows the user to create Key Milestones using the Workbench which stores the data in the Workbench database. The user must provide data into the required fields. If one of the required fields is not completed, the user will be prompted to include the data in to the missing required fields. After a user has successfully completed an Key Milestone, they will see a preview of the Key Milestone. From the preview screen, the user can: 1. Go back and edit the Key Milestone or 2. Save the Key Milestones in the database. Note that a user can always return at a future date/time to edit the Key Milestones.

The Create screen requires the user to input data into the following fields:

TABLE 12

Key Milestones Fields-Create

| Field Name | Field Type | Description |
| --- | --- | --- |
| Name | Drop down list | Required |
| Team | Drop down list | Required |
| Event | Drop down list | Required |
| Area | Drop down list | Required |
| Title | Text Box-25 char maximum | Required |
| Detail Description | Text Area-No limits | Optional |
| Current Status | Drop Down (Not Started, In Progress, Late, Completed) | Default = Not Started |
| Priority | Drop down-high, medium, low. | Default = high |
| Impacts - Type | Drop Down-read from DB; 1+ | Default = "None" |

TABLE 12-continued

Key Milestones Fields-Create

| Field Name | Field Type | Description |
|---|---|---|
| Impacts - Event | Drop Down-read from DB 1+ | Default = "None" |
| Impacts - Area | Drop Down-read from DB 1+ | Default = "None" |
| Comments: | Text Area | Optional |
| Dependencies | Drop Down-read from DB; 1+ | Default = "None" |
| Scheduled Start | 3 Drop Downs (Mo., Day, Yr.) | Required |
| Scheduled End | 3 Drop Downs (Mo., Day, Yr.) | Required |

The user must input a value into each of the required fields. Also, certain validations occur specifically for the date fields. The following rules are validated:

❖ The Scheduled Start Date can not be greater than the Scheduled End Date.

❖ The Two Dates can not be equal.

If one or more fields that are required are left blank an error message will appear displaying the list of fields that are incorrect. Once all fields have been validated a Preview screen will be displayed which will allow the user the opportunity to view what his/her Key Milestone will look like when displayed and based on that, either Submit the Key Milestone or go back and Edit the Key Milestone. When the user clicks "Submit" the new Key Milestone will be entered into the database, the user will receive a confirmation dialog box and will be returned to the Display Screen listing the most recent Key Milestones.

Another area of functionality allows the user to search for Key Milestones in the Workbench database using a search criteria. If the user conducts a search with no search criteria, all of the Key Milestones in the database will be listed displaying 10 at a time. If no Key Milestones are found that match the search criteria, a screen will appear stating that no results were found and a link will be provided to return and edit the search criteria.

The user can use and of the fields listed below for their search:

TABLE 13

Search Issue Fields

| Field Name | Field Type | Description |
|---|---|---|
| Name | Drop down list | Optional |
| Team | Drop down list | Optional |
| Event | Drop down list | Optional |
| Area | Drop down list | Optional |
| Priority | Drop down list | Optional |
| Impacts - Type, Area, or Event | Drop down list | Optional |
| Dependencies | Drop down list | Optional |
| Scheduled End Date From | 3 Drop Down Fields | Optional |
| Scheduled End Date To | 3 Drop Down Fields | Optional |

A successful search will display the results in a table format. These results will be displayed in descending order by using End date to sort them. The search results screen will display a set of 10 results. If more than 10 results are found, each result screen will link to the next set of 10 results.

The following fields will be displayed on the results screen table:

TABLE 14

Search Key Milestones Results Screen

| Field Name | Description |
|---|---|
| Number | Automatically generated when Milestone is created. |
| Owner | Person who created milestone |
| Title | Link to display Key Milestone |
| Team | Read from Access database. |
| Area | Read from Access database. |
| Event | Read from Access database. |
| Target Date | Sorted by descending order. |

From this screen the user can:

5. Click "Edit Search Criteria" to return to the main search screen to edit the search criteria.
6. Click "Generate Detail Report" to create a report of all the Key Milestones that met the search criteria.
7. Click "Generate Summary Report" to create a report that displays a listing of all Key Milestones that met the search criteria.

If a user clicks on a link made from the search or main screen, the user will see the specific Key Milestone. The fields that will be shown include:

TABLE 15

Display Results Screen

| Field Name | Description |
|---|---|
| Milestone # | Created by Access. |
| Owner | Read from Access database. |
| Team | Read from Access database. |
| Event | Read from Access database. |
| Area | Read from Access database. |
| Title | Read from Access database. |
| Scheduled End | Displayed as month-day-year |
| Scheduled Start | Sorted by descending order. |
| Dependencies | Shown in Bullet style |
| Impacts | Shown in Bullet style |
| Issues/Risks/Concerns | Shown in Bullet style |
| Comments | Shown in Paragraph format.-if any |
| Person making Comment | Read from Access database.-if any |
| Revised End | Displayed as month-day-year-if any |
| Revised Start | Displayed as month-day-year-if any |

From this display of a Key Milestones. The user can:

1. Click "Back" and return to the list of all Key Milestones.
2. Click "Print" and print the individual Key Milestones
3. Click "Edit" and edit the current Key Milestones.

If a user wants to add fields or make changes to their status report, they have editing ability on most fields. The following fields can not be edited:

TABLE 16

Non-Editable Fields

| Field Name |
|---|
| Owner |
| Team |
| Event |
| Area |
| Milestone Title |

TABLE 16-continued

Non-Editable Fields

Field Name

Long Description
Scheduled End
Scheduled Start

The remainder of fields can be edited. In addition to the fields shown when a milestone was created, when a Key Milestone is being edited, the user will have a few new fields to work with. Each time a person wants to edit the Key Milestone, they will have the ability to add a comment and create a revised start & end date. The following fields will be added when a Key Milestone is added:

TABLE 17

| Field | Description |
| --- | --- |
| Name | Name of person making edit |
| Date | Automatically Generated by Program-not seen by user. |
| Comment: | Optional Text area |
| Revised Start: | Date: mm-dd-yyyy |
| Revised End: | Date: mm-dd-yyyy |

If the user enters any text or makes a change to the Comments, Revised Start or Revised End field, they must enter a value for Name. If they do not they will receive a validation error returning them back to the form. When the user completes the edits, s/he can, as they did when they created a key milestone, first preview their key milestone and than save it into the database. The new changes and additions can be seen when the Key Milestone details are displayed.

Yet another area of functionality will allow the user to generate a Detail or Summary report of key milestones. This report can be created based on the same criteria that are provided through the SEARCH functionality. Detail Reports are created by clicking on a button labeled 'Generate Detail Report' on the 'Search Results' screen. The user will have a choice to print the report. The fields within the detail report are identical to those described in the "Display Results Screen".

Each Key Milestone will be separated with a horizontal rule.

Summary Reports are created by click on a button labeled "Generate Summary Report" on the Search Results screen. The user will be able to print the report or simply view it on the screen. The summary report will resemble the initial search results screen but will not limit the number of records shown to 10. The fields within the list report are the same as the fields in the Search Key Milestones Results screen.

The Help section of Key Milestones will include three areas and will be accessible from any Key Milestone screen. The three areas include:

1. About Key Milestones: A brief description of Key Milestones and their impact and importance within the M & A Effort.
2. About The Template: A listing of all the fields within the Key Milestone's template and a description of each field.
3. Navigation: A listing of the navigational options from within the Key Milestone's function.

The Key Milestones application has the following technical requirements for a target machine:

ODBC version 2.0 and higher

An ODBC compliant database such as Microsoft Access, Microsoft SQL Server, or IBM DB 2

A Web server that supports CGI programs

Perl 5

A www browser no earlier than Microsoft Internet Explorer 4 or Netscape™ 4.0

Key Milestones is composed of five modules. These modules are named Create, Search, Display Searched Results, Generate Reports and Edit Key Milestones.

Figure 12:
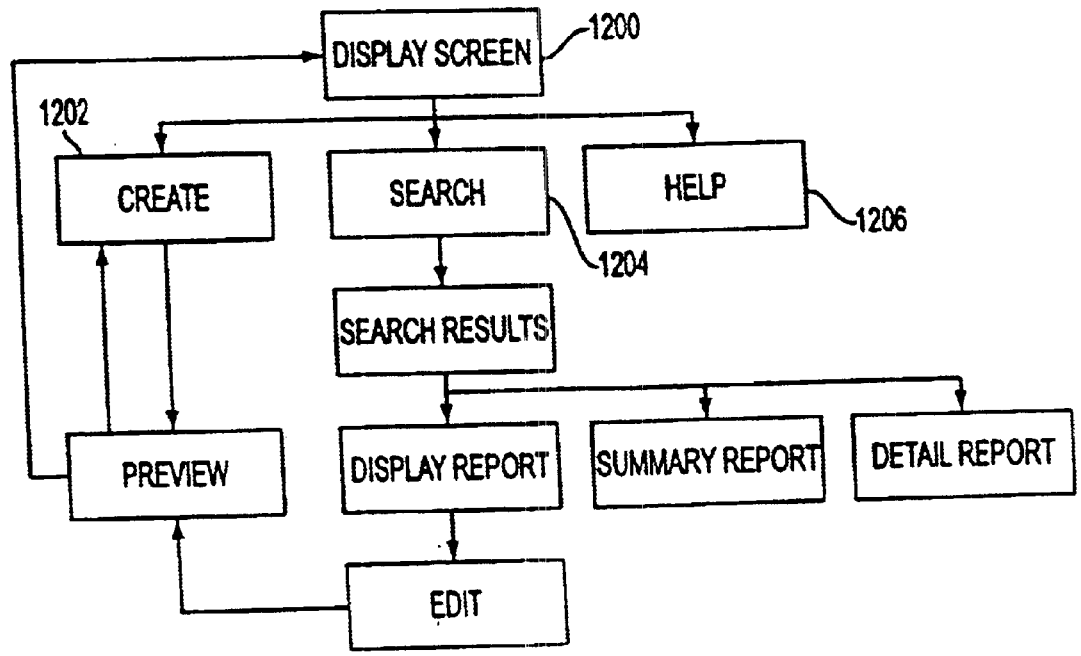
FIG. 12 is a diagram that depicts the basic flow of navigation throughout the application's screens.

All tables are stored within an ODBC compliant database. The five modules and their relationship to the issues and comments table is shown below:

It should also be noted that the input forms for the CREATE, SEARCH and UPDATE modules are generated by a module that will extract data from the tblMembers table and the tblMergerTeam tables from within the database FIG. 12 is a diagram that depicts the basic flow of navigation throughout the application's screens. The first screen in the Key Milestones application is the Main screen 1200. This screen presents the user with a list of all the Status Reports sorted by most recently ending. The user is able to go to CREATE 1202, SEARCH 1204, and HELP 1206 from any of the pages within the application.

Project Planning

The Project Planning function allows users to upload and track project planning files for themselves, others and teams within the M & A effort. The Project Planning function is to be used by both Andersen Consulting and client personnel.

The Project Planning application will provide three basic areas of functionality:

Create/Upload Project Planning Files

Search Project Planning Files

Help with the Project Planning function.

Each screen that is related to these areas of functionality will contain the following buttons:

TABLE 18

| Button Name | Description |
| --- | --- |
| Create | The CREATE Project Planning screen is displayed |
| Search | The SEARCH Project Planning screen is displayed |
| Help | Provides instructions for the area of functionality. |

The main screen serves as an entry point to the Project Planning function. The Main Screen will list the records of the current Project Planning files uploaded within the Workbench. The Main Screen should be populated with high level data regarding the Project Planning entries. The data is stored in an Access database and retrieved using CGI scripts.

The results will be broken into groups of 10 results at a time. If more than 10 results exist, a link to the "Next 10" records will be displayed on the bottom right hand corner of the results set. If the user proceeds to the next 10 results a link to move back to the Previous 10 will activate on the bottom left hand corner of the display.

The display can include the following information:

TABLE 19

| Field Name | Format | Description |
| --- | --- | --- |
| Owner | First Last Name | The person who uploaded the file represented. The |

TABLE 19-continued

| Field Name | Format | Description |
|---|---|---|
| | | name will serve as a link to the actual Project Planning file. |
| Team | Team Name | The name of the Team the file is referencing. |
| Event | Event Name | The name of the Event the file is referencing. |
| Area | Area Name | The name of the Area the file is referencing. |
| Title | 25 Characters Maximum | The Title given to the file. |
| Date Created | mm-dd-yyyy | The Date the file was Uploaded (not necessarily made). |

This area of functionality allows the user to create a Project Planning file using the Workbench and a template. A Project Planning template is provided. This template will give the users a generic template of how Project Planning files should look.

By click on the template, the file should open in its respective application. Once the user, using the template, creates his/her Project Planning file the file should be saved on their local disk drive.

This functionality is dependent on the assumption that once the file was created, the user would upload the file into the Workbench repository. The user is required to complete a short form including the following fields:

TABLE 20

Create Screen

| Field Name | Field Type | Description |
|---|---|---|
| Name | Drop down list | Required |
| Team | Drop down list | Required |
| Event | Drop down list | Required |
| Area | Drop down list | Required |
| Title: | Text field-25 Character Maximum | Required |
| File To Attach: | File Field-No Character limit | Required |

The user must select a value for each of the fields. If one or more of the fields are left blank and the user clicks "Attach" an error message should appear displaying the list of fields that the user neglected to complete followed by a link to return to the Create Screen. If this occurs, all the fields that were completed appropriately by the user should remain selected except for the "File To Attach" field. This field will reset automatically and must be entered again.

When all appropriate fields are entered and the "Attach" button is click the user will receive a confirmation pop-up window stating "Thank You for attaching your Project Planning File." Once the user clicks "OK" the user is returned to the Main Screen.

If the file that the user is attempting to upload already exists in the Project Planning repository, the user will receive an error message stating the file already exists. The user will be given two links from this error page. One will allow the user to return to the Create Screen and select a different file or change the file name. The second will link to a for identical to the Create Screen but will allow the user to submit a file that already exists. By selecting the "Over- write" link, the user will have to re-enter the file name and click "Overwrite" on the Overwrite form. A warning message will be displayed on the form notifying the user that if they proceed to copy a file with the same name as one that already exists, the old file will be lost and replaced with the new one. This is a irreversible function.

Once a file is uploaded, the CGI script creates a new entry into the Access Database and this new entry should appear as the top item on the Main Screen Display.

This area of functionality allows the user to search for all Project planning files in the Workbench database using a specified search criteria. If the user conducts a search with no search criteria, all of the Project Planning files in the database will be listed displaying 10 at a time as they were displayed in the Main screen. If no Project Planning are found that match the search criteria, a screen will appear stating that no results were found and provide a link back to change the search criteria.

The user can use any of the below fields or any combination of them into the Search Screen input form:

TABLE 21

Search

| Field Name | Field Type | Description |
|---|---|---|
| Name | Drop down list | Optional |
| Team | Drop down list | Optional |
| Event | Drop down list | Optional |
| Area | Drop down list | Optional |
| Date Created-From | 3 Drop Down Field | Optional-Month, day and year must be used. |
| Date Created-To | 3 Drop Down Field | Optional-Month, day and year must be used. |

Using the search criteria (if no search criteria is chosen, all the results are shown) the program will search the Access Database for any records meet the specified criteria.

A successful search will display the results in a table format. These results will be displayed in descending order by using the Date Created. The search results screen will display a set of 10 results. If more than 10 results are found, each result screen will link to the next set of 10 results.

The following fields will be displayed on the results screen table:

TABLE 22

Search Project Planning Results Screen

| Field Name | Description |
|---|---|
| Owner | Link to the respective file. |
| Team | Read from Access Database. |
| Event | Read from Access Database. |
| Area | Read from Access Database. |
| Title | Read from Access Database |
| Date Created | Shown as mm-dd-yyyy. Sorted Descending |

From this screen the user can:
1. Click "Edit Search Criteria" to return to the main search screen to edit the search criteria. When the user does this, the search criteria already used will remain selected.
2. Scroll between the next 10 or previous 10 results if any.
3. Click on any individual result to open the respective Project Planning file.

The Help screen is accessible from any screen within the Project Planning function. The Help screen is divided into 3 sections: About Project Planning, About The Template, & Navigation.

The About Project Planning section will provide a brief explanation of what is meant by Project Planning and how it can be used within the M & A effort.

The About The Template section will provide a list and description of all the fields the user must complete to upload a Project Planning File.

The Navigation section will list and describe each navigational option the user has. Each button or link within the Project Planning function will be listed and described.

The Help screen has three links representing each of the three sections. The user can click on one of these links to move to a particular section or the user can simply scroll up or down with the right hand side scroll bar.

The Project Planning application has the following technical requirements for a target machine:

ODBC version 2.0 and higher

An ODBC compliant database such as Microsoft Access, Microsoft SQL Server, or IBM DB 2

A Web server that supports CGI programs

Perl 5—with CGI.pm library

A www browser no earlier than Microsoft Internet Explorer 4 or Netscape™ 4.0

Project planning is composed of two modules. These modules are named Create and Search. All of the Project Planning files are stored in the Deliverables Repository and the owner data is stored in the Workbench database within 1 table.

Figure 12A:
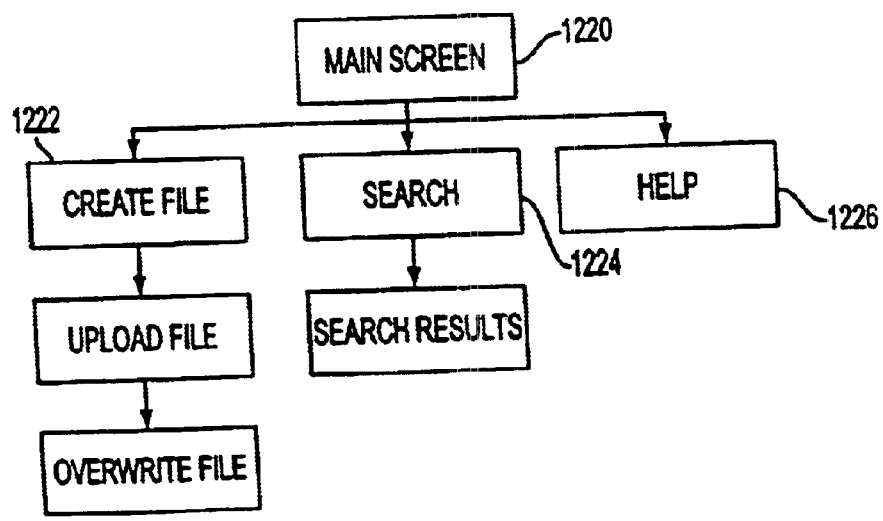
FIG. 12A is a chart that depicts a flow of navigation through a Project Planning application.

FIG. 12A shows that a first screen in the Project Planning application is the "Main Screen" 1220. This screen presents the user with a list of all the Project Planning Entries sorted by most recently created. The user is able to go to CREATE 1222, SEARCH 1224, and HELP 1226 from any of the pages within the application. The following diagram depicts the basic flow of navigation throughout the application's screens:

Decision Management Tool

The Decision Management tools provide a forum to review and update important decisions being made that impact the merger. There are five Decision Management functions, namely key decisions, issue management, change control, readiness assessment, and a discussion database.

Figure 13:
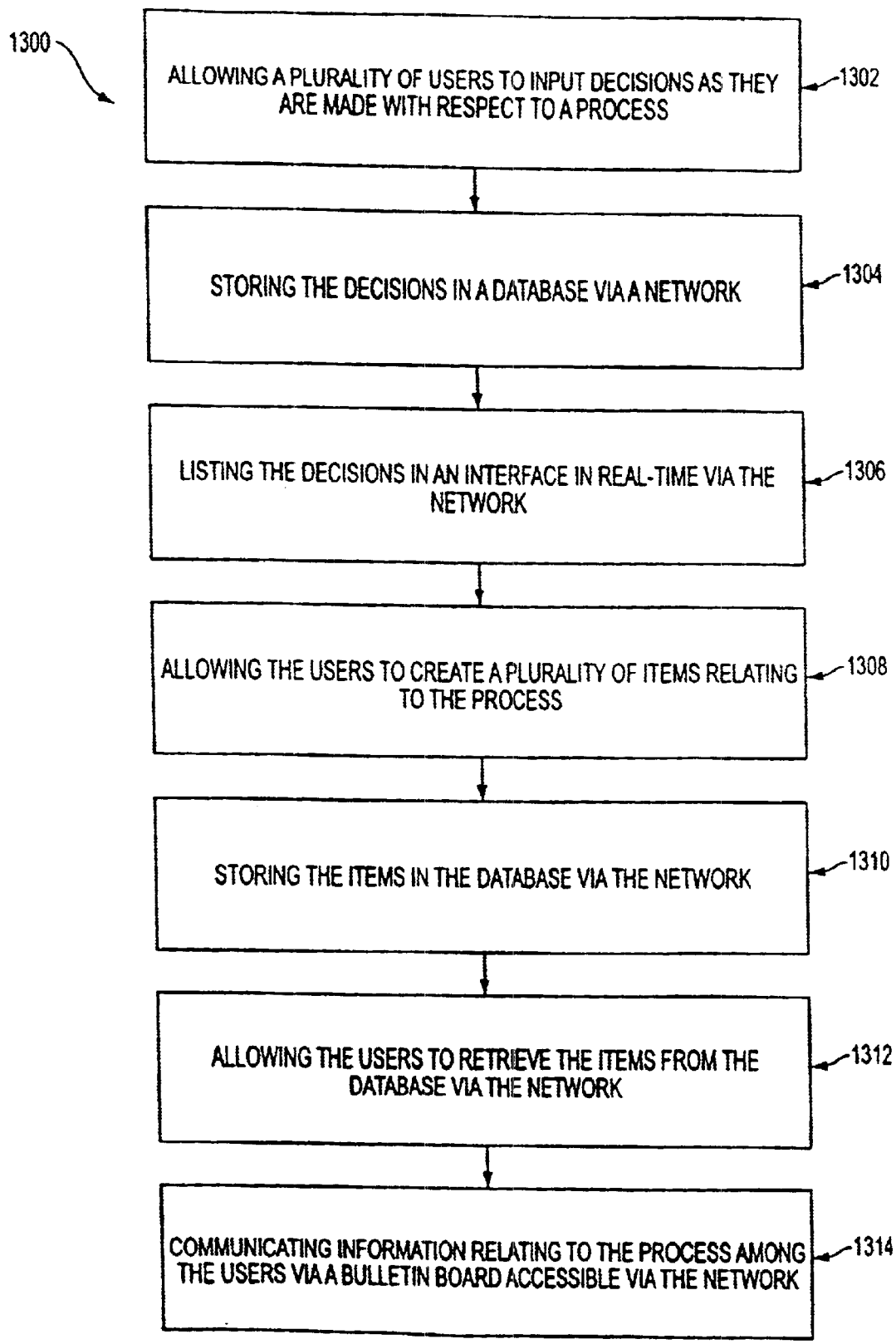
FIG. 13 is a flow chart depicting a method for decision management during the execution of a process.

FIG. 13 illustrates the various steps 1300 associated with the decision management tool 704 of FIG. 7. As shown, a plurality of users are allowed to input decisions as they are made with respect to a process in operation 1302. The decisions are stored in a database in operation 1304 via a network. In operation 1306, the decisions are listed in an interface in real-time via the network. The users are allowed to create a plurality of items relating to the process in operation 1308. The items are stored in the database in operation 1310 via the network. In operation 1312, the users are allowed to retrieve the items from the database via the network. In operation 1314, information relating to the process is communicated among the users via a bulletin board accessible via the network.

In an aspect of the present invention, the process may be a merger or acquisition. In another aspect of the present invention, the network may includes a wide area network. More specifically, in an embodiment of the present invention, the network may include the Internet.

In another embodiment of the present invention, requests for increasing a scope of the process may also be received and stored. In a further embodiment of the present invention, the items may include status reports, milestones, issues and/or workplans.

Key Decision

The key decision functionality lists the major merger-wide executive decisions that have been determined. This provides a simplistic, yet critical service of keeping all interested parties abreast of various happenings.

Issue Management

The Issue Management application allows users of the M & A Workbench to track issues relating to the Merger or Acquisition. A user can create an "issue" that can be serviced by the appropriate personnel on the M & A project.

The Issue Management application will provide three basic areas of functionality:

Create Issue

Edit/Update Issue

Search Issue

Issue Report

Each screen that is related to these areas of functionality will contain the following buttons:

TABLE 23

| Button Name | Description |
| --- | --- |
| Create | The CREATE ISSUE screen is displayed |
| Search | The SEARCH ISSUE screen is displayed |
| Help | Provides instructions for the area of functionality that the user is in. |

The three areas of functionality are described below:

A first area of functionality allows the user to create an issue in the ISSUES database. The user must provide data into the required fields. If one of the required fields is not completed, the user will be prompted to include the data in to the missing required fields. After a user has successfully created an issue, a confirmation screen will appear. This screen will contain the entire set of fields that are associated with the issue.

The user must input the fields listed below into the CREATE ISSUE input form:

TABLE 24

Create Issue Fields

| Field Name | Field Type | Description |
| --- | --- | --- |
| Identified By | Drop down list | Required |
| Team | Drop down list | Required |
| Status | Drop down list | Required (Open, Closed or Deferred) |
| Priority | Drop down list | Required (High, Medium or Low) |
| Executive Attention | Checkbox | Yes/No (default) |
| Event | Drop down list | Optional |
| Assigned To | Drop Down list | Optional |
| Area | Drop down list | Optional |
| Target Date | Drop down list | Required (MMM-DD-YYYY) |
| Short Description | Text box | Required (Up to 25 Characters) |
| Detailed Description | Multiple Line Text Box | Required |
| Recommendation | Multiple Line Text Box | Optional |

When an issue is created the following fields are generated automatically and added to the issue:

TABLE 25

Create Issue: Fields that are automatically generated

| Field Name | Value |
| --- | --- |
| Issue Number | The number of the next successive issue |
| Date Entered | The date that the issue was created |

Another area of functionality allows the user to search for an issue in the ISSUES database using a search criteria. If the user conducts a search with no search criteria, all of the issues in the issues database will be listed. If no issues are found that match the search criteria, a screen will appear stating that no results were found. The user must input the fields listed below into the SEARCH ISSUE input form:

TABLE 26

Search Fields

| Field Name | Field Type | Description |
| --- | --- | --- |
| Identified By | Drop down list | Optional |
| Team | Drop down list | Optional |
| Priority | Drop down list | Optional |
| Assigned To | Drop down list | Optional |
| Status | Drop down list | Optional |
| Executive Attention | Checkbox | Optional |
| Target Date | Drop down list | Optional |
| Date Entered Range | Drop down list | Optional |

A successful search will display the results in a table format. These results will be displayed in descending order by using the DATE ENTERED. The search results screen will display a set of 10 results. If more than 10 results are found, each result screen will link to the next set of 10 results. The top of the results screen will display the search criteria and at the bottom the number of matching records and the total number of records will display.

The following fields will be displayed on the results screen table:

TABLE 27

Search Results Screen

| Field Name | Description |
| --- | --- |
| Identified By | Link to issue |
| Team | Red if issue is overdue |
| Short Description | Red if issue is overdue |
| Status | Red if issue is overdue |
| Priority | Red if issue is overdue |
| Event | Red if issue is overdue |
| Area | Red if issue is overdue |
| Date Entered | Red if issue is overdue |

Still yet another area of functionality allows a user to update an issue whose STATUS field is either 'Open' or 'Deferred'. A user cannot update a 'Closed Issue'. In addition to providing updates to an issue, the EDIT ISSUE screen allows the user to add recommendation to an ISSUE.

The following fields are contained within the UPDATE ISSUE screen:

TABLE 28

Update Issue Fields
(Open or Deferred Issues Only)

| Field Name | Field Type | Description |
| --- | --- | --- |
| Identified By | Static Text | Non-updateable |
| Team | Static Text | Non-updateable |
| Status | Drop down list | Updateable |
| Priority | Drop down list | Updateable |
| Executive Attention | Checkbox | Updateable |
| Event | Static Text | Non-updateable |
| Assigned To | Drop Down list | Updateable |
| Area | Static Text | Non-updateable |
| Target Date | Drop Down list | Updateable |
| Short Description | Static Text | Non-updateable |
| Detailed Description | Static Text | Non-updateable |
| Recommendation | Multiple Line Text Box | Updateable |
| Closed By | Drop Down | Optional |
| Date Closed | Static Text | Non-updateable |

The present area of functionality will allow the user to generate a report of issues. This report can be created based on the same criteria that are provided through the SEARCH functionality. Issue Reports are created by clicking on a button labeled 'Generate Report' on the 'Search Results' screen. The user will have a choice whether to print the report to the screen or directly to the printer. The fields within the report are listed below.

TABLE 29

| Field Name |
| --- |
| Issue Number |
| Identified By |
| Team |
| Status |
| Priority |
| Date Entered |
| Executive Attention |
| Event |
| Assigned To: |
| Area |
| Target Date |
| Short Description |
| Detailed Description |
| Recommendation |
| Closed By |
| Date Closed |

The Issue Management application has the following technical requirements for a target machine:

ODBC version 2.0 and higher

An ODBC compliant database such as Microsoft Access, Microsoft SQL Server, or IBM DB 2

A Web server that supports CGI programs

Perl 5

Microsoft Internet Explorer 4 r higher/Netscape™ 4.0 or higher

Issue Management is composed of five modules. These modules are named Create, Search, Edit/Update, Summary Report and Detail Report. All of the issues are stored in the ISSUES table. This table is stored within an ODBC compliant database.

It should also be noted that the input fields for the CREATE, SEARCH and UPDATE modules are generated by extracting data from Member table and Team table.

The first screen in the Issue Management application is the list of ISSUES. This screen presents the user with a list of all issues order by date created. The user is able to go to CREATE, SEARCH, and HELP from any of the pages within the application.

The Issue Management application will create Issue. It will also have the capability to generate detail/summary reports of issues.

Readiness Assessment

The Readiness Assessment function allows users to upload and track Readiness Assessment files for themselves, others and teams within the M & A effort. The Readiness Assessment function is to be used by both Andersen Consulting and client personnel.

The Readiness Assessment application will provide thee basic areas of functionality:

Create/Upload Readiness Assessment Files

Search Readiness Assessment Files

Help with the Readiness Assessment function.

Each screen that is related to these areas of functionality will contain the following buttons:

TABLE 30

| Button Name | Description |
| --- | --- |
| Create | The CREATE Readiness Assessment screen is displayed |
| Search | The SEARCH Readiness Assessment screen is displayed |
| Help | Provides instructions for the area of functionality. |

The main screen serves as an entry point to the Readiness Assessment function. The Main Screen will list the records of the current Readiness Assessment files uploaded within the Workbench. The Main Screen should be populated with high level data regarding the Readiness Assessment entries. The data is stored in an Access database and retrieved using CGI scripts.

The results will be broken into groups of 10 results at a time. If more than 10 results exist, a link to the "Next 10" records will be displayed on the bottom right hand corner of the results set. If the user proceeds to the next 10 results a link to move back to the Previous 10 will activate on the bottom left hand corner of the display.

The display will include the following information:

TABLE 31

| Field Name | Format | Description |
| --- | --- | --- |
| Owner | First Last Name | The person who uploaded the file represented. The name will serve as a link to the actual Readiness Assessment file. |
| Team | Team Name | The name of the Team the file is referencing. |
| Event | Event Name | The name of the Event the file is referencing. |
| Area | Area Name | The name of the Area the file is referencing. |
| Title | 25 Characters Maximum | The Title given to the file. |

TABLE 31-continued

| Field Name | Format | Description |
| --- | --- | --- |
| Date Created | mm-dd-yyyy | The Date the file was Uploaded (not necessarily made). |

This area of functionality allows the user to create a Readiness Assessment file using the Workbench and a template. A Readiness Assessment template is provided. This template will give the users a generic template of how Readiness Assessment files should look.

By click on the template, the file should open in its respective application. Once the user, using the template, creates his/her Readiness Assessment file the file should be saved on their local disk drive.

This functionality is dependent on the assumption that once the file was created, the user would upload the file into the Workbench repository. The user is required to complete a short form including the following fields:

TABLE 32

Create Screen

| Field Name | Field Type | Description |
| --- | --- | --- |
| Name | Drop down list | Required |
| Team | Drop down list | Required |
| Event | Drop down list | Required |
| Area | Drop down list | Required |
| Title: | Text field-25 Character Maximum | Required |
| File To Attach: | File Field-No Character limit | Required |

The user must select a value for each of the fields. If one or more of the fields are left blank and the user clicks "Attach" an error message should appear displaying the list of fields that the user neglected to complete followed by a link to return to the Create Screen. If this occurs, all the fields that were completed appropriately by the user should remain selected except for the "File To Attach" field. This field will reset automatically and must be entered again.

When all appropriate fields are entered and the "Attach" button is click the user will receive a confirmation pop-up window stating "Thank You for attaching your Readiness Assessment File." Once the user clicks "OK" the user is returned to the Main Screen.

If the file that the user is attempting to upload already exists in the Readiness Assessment repository, the user will receive an error message stating the file already exists. The user will be given two links from this error page. One will allow the user to return to the Create Screen and select a different file or change the file name. The second will link to a for identical to the Create Screen but will allow the user to submit a file that already exists. By selecting the "Overwrite" link, the user will have to re-enter the file name and click "Overwrite" on the Overwrite form. A warning message will be displayed on the form notifying the user that if they proceed to copy a file with the same name as one that already exists, the old file will be lost and replaced with the new one. This is a irreversible function.

Once a file is uploaded, the CGI script creates a new entry into the Access Database and this new entry should appear as the top item on the Main Screen Display.

This area of functionality allows the user to search for all Readiness Assessment files in the Workbench database using a specified search criteria. If the user conducts a search with no search criteria, all of the Readiness Assessment files in the database will be listed displaying 10 at a time as they were displayed in the Main screen. If no Readiness Assessment are found that match the search criteria, a screen will appear stating that no results were found and provide a link back to change the search criteria.

The user can use any of the below fields or any combination of them into the Search Screen input form:

TABLE 33

Search

| Field Name | Field Type | Description |
|---|---|---|
| Name | Drop down list | Optional |
| Team | Drop down list | Optional |
| Event | Drop down list | Optional |
| Area | Drop down list | Optional |
| Date Created-From | 3 Drop Down Field | Optional-Month, day and year must be used. |
| Date Created-To | 3 Drop Down Field | Optional-Month, day and year must be used. |

Using the search criteria (if no search criteria is chosen, all the results are shown) the program will search the Access Database for any records meet the specified criteria.

A successful search will display the results in a table format. These results will be displayed in descending order by using the Date Created. The search results screen will display a set of 10 results. If more than 10 results are found, each result screen will link to the next set of 10 results.

The following fields will be displayed on the results screen table:

TABLE 34

Search Readiness Assessment Results Screen

| Field Name | Description |
|---|---|
| Owner | Link to the respective file. |
| Team | Read from Access Database. |
| Event | Read from Access Database. |
| Area | Read from Access Database. |
| Title | Read from Access Database |
| Date Created | Shown as mm-dd-yyyy. Sorted Descending |

From this screen the user can:
1. Click "Edit Search Criteria" to return to the main search screen to edit the search criteria. When the user does this, the search criteria already used will remain selected.
2. Scroll between the next 10 or previous 10 results if any.
3. Click on any individual result to open the respective Readiness Assessment file.

The Help screen is accessible from any screen within the Readiness Assessment function. The Help screen is divided into 3 sections: About Readiness Assessment, About The Template, & Navigation.

The About Readiness Assessment section will provide a brief explanation of what is meant by Readiness Assessment and how it can be used within the M & A effort.

The About The Template section will provide a list and description of all the fields the user must complete to upload a Readiness Assessment File.

The Navigation section will list and describe each navigational option the user has. Each button or link within the Readiness Assessment function will be listed and described.

The Help screen has three links representing each of the three sections. The user can click on one of these links to move to a particular section or the user can simply scroll up or down with the right hand side scroll bar.

The Readiness Assessment application has the following technical requirements for a target machine:

ODBC version 2.0 and higher

An ODBC compliant database such as Microsoft Access, Microsoft SQL Server, or IBM DB 2

A Web server that supports CGI programs

Per 5—with CGI.pm library

A www browser no earlier than Microsoft Internet Explorer 4 or Netscape. The Issue Management application has the following technical requirements for a target machine:

ODBC version 2.0 and higher

An ODBC compliant database such as Microsoft Access, Microsoft SQL Server, or IBM DB 2

A Web server that supports CGI programs

Perl 5

Microsoft Internet Explorer 4 or higher/Netscape™ 4.0

Readiness Assessment is composed of two modules. These modules are named Create and Search. All of the Readiness Assessment files are stored in the Deliverables Repository and the owner data is stored in the Workbench database within 1 table.

Figure 14:
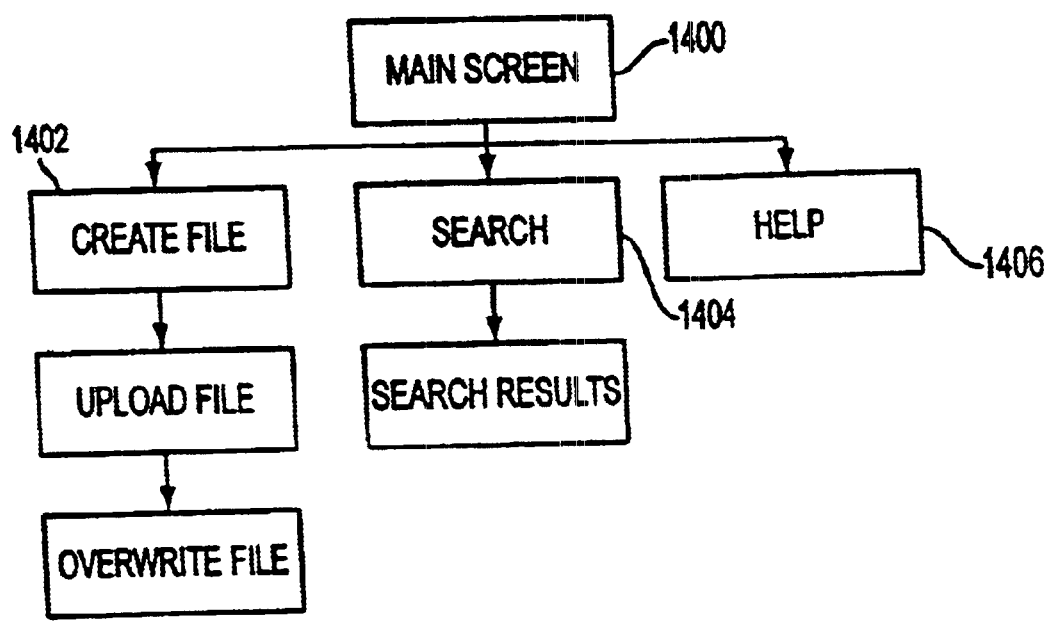
FIG. 14 is a flow diagram of the user interface functionality of a readiness assessment application.

FIG. 14 shows a flow diagram of the user interface functionality of the readiness assessment application. The first screen in the Readiness Assessment application is the "Main Screen". This screen presents the user with a list of all the Readiness Assessment Entries sorted by most recently created. The user is able to go to CREATE, SEARCH, and HELP from any of the pages within the application. The following diagram depicts the basic flow of navigation throughout the application's screens:

The Readiness Assessment application will upload files associated with Readiness Assessment into the Deliverables Repository while recording the new deliverable within the Access database.

Discussion Database

The discussion database gives users a medium for asking and answering merger questions in a discussion thread. Such database was discussed hereinabove during reference to FIGS. 5 and 6.

Value Realization

Value realization 706 of FIG. 7 provide context to understand actual financial costs/benefits and potential value related to the merger. There are four value realization functions, namely benefits realization, budget management, business cases, and value analysis.

Benefits realization determines the benefits to performing certain activities or making certain integration decisions. Budget management allows users to create and retrieve budgets and financials for all projects. Business cases allows users to create and retrieve business case information for all merger projects and initiatives. Value analysis provides a framework for determining value to the client throughout the entire merger lifecycle.

Execution

The Execution tools 708 of FIG. 8 include many of the integration specific activities that need to be completed. There are five Execution functions, anmely communications, quality management, risk management, testing, and conversion events.

Communications allows users to access all customer and employee communications. Quality management provides area to address quality planning and reviews and to calculate project metrics. Risk management addresses all risks/impacts to the integration, such as customer, support and contingencies. Testing provides a centralized tool to perform all scripting, execution and SIR resolution. Conversion events contains all the tools and components required for running the conversion command center Reference The Reference section contains additional tools that are necessary during the M&A effort. There are four Reference functions, namely deliverables library, contacts, calendars, and organization charts.

Deliverables Library

The Deliverable Repository function allows users to create, modify and track all Deliverable types available in the Workbench for themselves, others and teams within a merger/acquisition.

For any given deliverable type, more detailed logic may be obtained in the design documentation of the specific function you are interested in.

The Deliverables Repository application will provide 3 basic areas of functionality:

Create Deliverable—obtain a template for the function of choice

Searching Deliverables

Help with Deliverable

Each screen that is related to these areas of functionality will contain the following buttons:

TABLE 35

| Button | Description |
| --- | --- |
| Create | The CREATE Deliverables Repository screen is displayed |
| Search | The SEARCH Deliverables Repository screen is displayed |
| Help | Provides instructions for the area of functionality that the user is in. |

The introductory screen serves as an entry point to the Deliverables Repository function. The Introductory Screen will list all deliverables accessible within the Workbench. Each Deliverable type listed on Introductory screen will be hyperlinked to the appropriate function's Main screen. On the Introductory screen, the user has the ability to Create, Search or obtain Help.

When the user clicks a deliverable type on the Introductory Screen, the Main Screen of that function results. The Main Screen serves as an entry point to a respective function. The Main Screen defaults the last 5 records of the that function within the Workbench. It is at the Main Screen that a user may begin navigating the respective function. The design documentation for a specific function may be viewed in order to access more detailed information.

From the Introductory screen, the user may opt to create a deliverable by pushing the 'Create' button. In doing so, the 'Create Deliverable' display screen is viewed. The user must obtain a deliverable template for the document they wish to create as well as upload a deliverable type that it is not provided in the Workbench. Data must be provided into the required and optional fields. If one of the required fields is not completed, the user will be prompted to include the data in to the missing required fields. The error message will list the field(s) missed and provide a link for the user to return and complete those fields. A list of all fields on the "Create Deliverable' screen are listed below. Those fields that are required fields are marked with an *asterisk.

TABLE 36

| Field Name |
| --- |
| Deliverable Type |
| Name* |
| Merger Team* |
| File 1 |
| File 1 Type |
| File 1 Title |
| File 2 |
| File 2 Type |
| File 2 Title |

Once the user fills out the form, they can push the 'Upload Files' button in order to save it in the database.

From the Introductory screen, the user may opt to search a deliverable by pushing the 'Search' button. In doing so, the 'Search Deliverables' display screen is viewed. Here the user is presented with five input fields without any required fields, including:

TABLE 37

| Field Name |
| --- |
| Document Type |
| Owner |
| Merger Team |
| Date Created Range: From |
| Date Created Range: To |

The user has the ability to generate a search that is extremely broad or very specific. For example, if 'Search' is clicked without pre-filling any fields, a search result will be displayed with every deliverable stored in the entire Workbench. If 'Document Type' and 'Owner' are pre-filled, then all the specified documents belonging to a specific owner will display. Finally, the user may specify a date range that a specific deliverable was generated. A successful search will display the results in a table format. These Search results will be displayed in groups of five. If more than five results exist, a link will appear that reads 'Next 10.' Once those documents appear, a link will appear that reads 'Prev 10', indicating to the user that they may return to the previous search results.

For each document that is displayed in a search result, the user has the ability to view the document by clicking on it. The document will display in 'read only' format.

The Deliverables Repository is comprised of 4 modules, including: Create, Search, Display Search Results, Edit Status Reports. All Deliverables are stored in the Workbench database within tables. All tables are stored within an ODBC compliant database.

It should also be noted that the input forms for the CREATE, SEARCH and UPDATE modules are generated by a module that will extract data from the tblMembers table and the tblMergerTeam tables from within the database Technical requirements for the present library is as follows:

A www browser; must be Microsoft Internet Explorer 4 or Netscape™ 4.0

A web server that supports CGI programs

ODBC version 2.0 or higher

An ODBC compliant database

Perl 5

The first screen in the Deliverables Repository application is the Introductory Screen. This screen presents the user with a list of all Deliverable types stored in the Workbench. The user has two options at the Introductory screen. They can access a specific function (Status Reports, Issue, etc) by clicking on the hyperlinked deliverables listed. Or, the user may click on CREATE, SEARCH, and HELP on this Introductory Screen. When 'Create' is clicked, the 'Create Deliverable screen is displayed. When the 'Search' button is clicked, the 'Search Deliverable' screen is displayed, and finally, when 'Search' is clicked, the 'Search Deliverables' screen is displayed.

The Deliverables Repository generates and accesses a variety of reports and documents necessary for a successful M&A effort. Every document used through an M&A engagement will be linked to the Deliverables Repository.

Contacts

The Contacts function will be used as a listing of all members from both the client organization and Andersen Consulting working on the M&A effort.

The Contact application will provide six basic areas of functionality:

Create Contact Information
Searching Contacts
Help with Contacts

Each screen that is related to these areas of functionality will contain the following buttons:

TABLE 38

| Button Name | Description |
| --- | --- |
| Create | The CREATE Contact screen is displayed |
| Search | The SEARCH Contact screen is displayed |
| Help | Provides instructions for the area of functionality that the user is in. |

The areas of functionality are described below:

The create area within Contacts is a bit misleading. That is because every person within the M & A effort is originally created within the Workbench by an Administrator within the Administrator Functions of the Workbench. In this function, individuals can "log on" and edit and their existing profiles. The Administration function will create Contacts assigning them a password. With that, a user can select his/her name enter the password that was assigned to them and (assuming they entered the same password) edit their profile. The following fields are available to the user:

TABLE 39

Contacts-Create

| Field Name | Field Type | Description |
| --- | --- | --- |
| Name | Text Box | Value present-changeable |
| Title | Text Box-25 char maximum | Optional |
| Old Password | Password | Optional-only need value if user wants to change password |
| New Password | Password | Optional |
| Re-Enter New Password | Password | Required if New Password field is used. |
| Email | Text box | Optional |
| Address | Office Address | Optional |
| Phone | Office phone | Optional |
| Office | Company office title | Optional |
| Pager | 10-digit number | Optional |
| Mobile Phone | 10-digit number | Optional |
| MemberID | Not Seen by User | Automatically generated field |

No fields are required by themselves, but some are dependent on others and therefore can become required. For example, if a user wants to change their password they must enter their Old Password and their new password twice. The Password field will also be validated to four characters/digits.

Once the user is complete entering his/her information, they can click "Submit" to save their changes into the database. They will receive a confirmation dialog box and will be returned to the main screen.

This function allows users to use a wildcard/keyword search of all contacts using either the name, team, email, office & team. This requires the user to select from a drop down box which field to search by and type in any text or parts of text that should be used as search criteria.

The Contacts function has the following technical requirements for a target machine:

ODBC version 2.0 and higher
An ODBC compliant database such as Microsoft Access, Microsoft SQL Server, or IBM DB2
A web server that supports CGI programs
Perl 5
A www browser no earlier than Microsoft Internet Explorer 4 or Netscape™ 4.0

Contacts is composed of three modules. These modules are named Create, Search, and Help.

All tables are stored within an ODBC compliant database. The five modules and their relationship to the issues and comments table is shown below:

It should also be noted that the input forms for the CREATE, SEARCH and UPDATE modules are generated by a module that will extract data from the tblMembers table and the tblMergerTeam tables from within the database The first screen in the Contacts application is the Main screen. This screen presents the user with a list of all the Contacts sorted by Name. The user is able to go to CREATE, SEARCH, and HELP from any of the pages within the application.

The calendars allow users to create and retrieve project calendars to track meeting schedules. The Organization Charts function allows users to upload and track Organization Charts files for themselves, others and teams within the M & A effort. The Organization Charts function is to be used by both Andersen Consulting and client personnel.

The Organization Charts application will provide thee basic areas of functionality:

Create/Upload Organization Charts Files
Search Organization Charts Files
Help with the Organization Charts function.

Each screen that is related to these areas of functionality will contain the following buttons:

TABLE 40

| Button Name | Description |
| --- | --- |
| Create | The CREATE Organization Charts screen is displayed |
| Search | The SEARCH Organization Charts screen is displayed |
| Help | Provides instructions for the area of functionality. |

The main screen serves as an entry point to the Organization Charts function. The Main Screen will list the records of the current Organization Charts files uploaded within the Workbench. The Main Screen should be populated with high level data regarding the Organization Charts entries. The data is stored in an Access database and retrieved using CGI scripts.

The results will be broken into groups of 10 results at a time. If more than 10 results exist, a link to the "Next 10"

records will be displayed on the bottom right hand corner of the results set. If the user proceeds to the next 10 results a link to move back to the Previous 10 will activate on the bottom left hand corner of the display.

The display will include the following information:

TABLE 41

| Field Name | Format | Description |
|---|---|---|
| Owner | First Last Name | The person who uploaded the file represented. The name will serve as a link to the actual Organization Charts file. |
| Team | Team Name | The name of the Team the file is referencing. |
| Event | Event Name | The name of the Event the file is referencing. |
| Area | Area Name | The name of the Area the file is referencing. |
| Title | 25 Characters Maximum | The Title given to the file. |
| Date Created | mm-dd-yyyy | The Date the file was Uploaded (not necessarily made). |

This area of functionality allows the user to create a Organization Charts file using the Workbench and a template. A Organization Charts template is provided. This template will give the users a generic template of how Organization Charts files should look.

By click on the template, the file should open in its respective application. Once the user, using the template, creates his/her Organization Charts file the file should be saved on their local disk drive.

This functionality is dependent on the assumption that once the file was created, the user would upload the file into the Workbench repository. The user is required to complete a short form including the following fields:

TABLE 42

Create Screen

| Field Name | Field Type | Description |
|---|---|---|
| Name | Drop down list | Required |
| Team | Drop down list | Required |
| Event | Drop down list | Required |
| Area | Drop down list | Required |
| Title: | Text field-25 Character Maximum | Required |
| File To Attach: | File Field-No Character limit | Required |

The user must select a value for each of the fields. If one or more of the fields are left blank and the user clicks "Attach" an error message should appear displaying the list of fields that the user neglected to complete followed by a link to return to the Create Screen. If this occurs, all the fields that were completed appropriately by the user should remain selected except for the "File To Attach" field. This field will reset automatically and must be entered again.

When all appropriate fields are entered and the "Attach" button is click the user will receive a confirmation pop-up window stating "Thank You for attaching your Organization Charts File." Once the user clicks "OK" the user is returned to the Main Screen.

If the file that the user is attempting to upload already exists in the Organization Charts repository, the user will receive an error message stating the file already exists. The user will be given two links from this error page. One will allow the user to return to the Create Screen and select a different file or change the file name. The second will link to a for identical to the Create Screen but will allow the user to submit a file that already exists. By selecting the "Overwrite" link, the user will have to re-enter the file name and click "Overwrite" on the Overwrite form. A warning message will be displayed on the form notifying the user that if they proceed to copy a file with the same name as one that already exists, the old file will be lost and replaced with the new one. This is a irreversible function.

Once a file is uploaded, the CGI script creates a new entry into the Access Database and this new entry should appear as the top item on the Main Screen Display.

This area of functionality allows the user to search for all Organization Charts files in the Workbench database using a specified search criteria. If the user conducts a search with no search criteria, all of the Organization Charts files in the database will be listed displaying 10 at a time as they were displayed in the Main screen. If no Organization Charts are found that match the search criteria, a screen will appear stating that no results were found and provide a link back to change the search criteria.

The user can use any of the below fields or any combination of them into the Search Screen input form:

TABLE 43

Search

| Field Name | Field Type | Description |
|---|---|---|
| Name | Drop down list | Optional |
| Team | Drop down list | Optional |
| Event | Drop down list | Optional |
| Area | Drop down list | Optional |
| Date Created-From | 3 Drop Down Field | Optional-Month, day and year must be used. |
| Date Created-To | 3 Drop Down Field | Optional-Month, day and year must be used. |

Using the search criteria (if no search criteria is chosen, all the results are shown) the program will search the Access Database for any records meet the specified criteria.

A successful search will display the results in a table format. These results will be displayed in descending order by using the Date Created. The search results screen will display a set of 10 results. If more than 10 results are found, each result screen will link to the next set of 10 results.

The following fields will be displayed on the results screen table:

TABLE 44

Search Organization Charts Results Screen

| Field Name | Description |
|---|---|
| Owner | Link to the respective file. |
| Team | Read from Access Database. |
| Event | Read from Access Database. |
| Area | Read from Access Database. |
| Title | Read from Access Database |
| Date Created | Shown as mm-dd-yyyy. Sorted Descending |

From this screen the user can:

Click "Edit Search Criteria" to return to the main search screen to edit the search criteria. When the user does this, the search criteria already used will remain selected.

Scroll between the next 10 or previous 10 results if any.

Click on any individual result to open the respective Organization Charts file.

The Help screen is accessible from any screen within the Organization Charts function. The Help screen is divided into 3 sections: About Organization Charts, About The Template, & Navigation.

The About Organization Charts section will provide a brief explanation of what is meant by Organization Charts and how it can be used within the M & A effort.

The About The Template section will provide a list and description of all the fields the user must complete to upload a Organization Charts File.

The Navigation section will list and describe each navigational option the user has. Each button or link within the Organization Charts function will be listed and described.

The Help screen has three links representing each of the three sections. The user can click on one of these links to move to a particular section or the user can simply scroll up or down with the right hand side scroll bar.

The Organization Charts application has the following technical requirements for a target machine:

ODBC version 2.0 and higher

An ODBC compliant database such as Microsoft Access, Microsoft SQL Server, or IBM DB2

A web server that supports CGI programs

Perl 5—with CGI.pm library

A www browser no earlier than Microsoft Internet Explorer 4 or Netscape™ 4.0

Organization Charts is composed of two modules. These modules are named Create and Search. All of the Organization Charts files are stored in the Deliverables Repository and the owner data is stored in the Workbench database within 1 table.

FIG. 14 illustrates the various screen flow in the Organization Charts section of the reference tool. The first screen in the Organization Charts application is the "Main Screen" 1400. This screen presents the user with a list of all the Organization Charts Entries sorted by most recently created. The user is able to go to CREATE 1402, SEARCH 1404, and HELP 1406 from any of the pages within the application. The following diagram depicts the basic flow of navigation throughout the application's screens:

The Organization Charts application will upload files associated with Organization Charts into the Deliverables Repository while recording the new deliverable within the Access database.

The M&A Planning Guide is an interactive web-based tool. This application allows its users, both client and Andersen Consulting personnel, to pick and choose the desired Activities and Questions that need to be considered when undertaking an M&A effort. In addition, the M&A Planning Guide offers non-client specific knowledge capital (points of view, best practices) that have been attained through Andersen's depth of experience in the M&A arena.

The Planning Guide application uses a www based client server architecture, where the database driving the client side is Microsoft Access. When users click on a given Phase, Activity, or Task input is passed to the www server which executes a particular Planning Guide module as a CGI program. The Planning Guide application is written in Html and the Perl scripting language.

The Planning Guide application is divided into 2 distinct screens. Each screen will display more specific information depending on where the user has navigated within the application. Such details include best practices selected from the group consisting of establishing an integration leadership team, making and documenting initial decisions, developing guiding principles and success factors, reviewing a current operating model, identifying integration planning projects, confirming a quick view target operating model, formalizing a stakeholder analysis, confirming a value of the merger or acquisition, establishing governance protocols, developing an initial customer retention approach, developing an initial employee redeployment and retention approach, developing an operations stability approach, identifying stakeholder communication requirements, creating initial announcements, creating a short-term communication plan, confirming model selection criteria, performing mapping, defining a target environment, determining gaps, defining impacts, defining and estimating work, iterating, prioritizing defined work, defining an integration sequence, determining delivery phases and dates, developing a human resources approach, developing an operations approach, and developing a technology approach.

The two main screens of the Planning Guide application are listed below:

Introduction Screen

Figure 15:
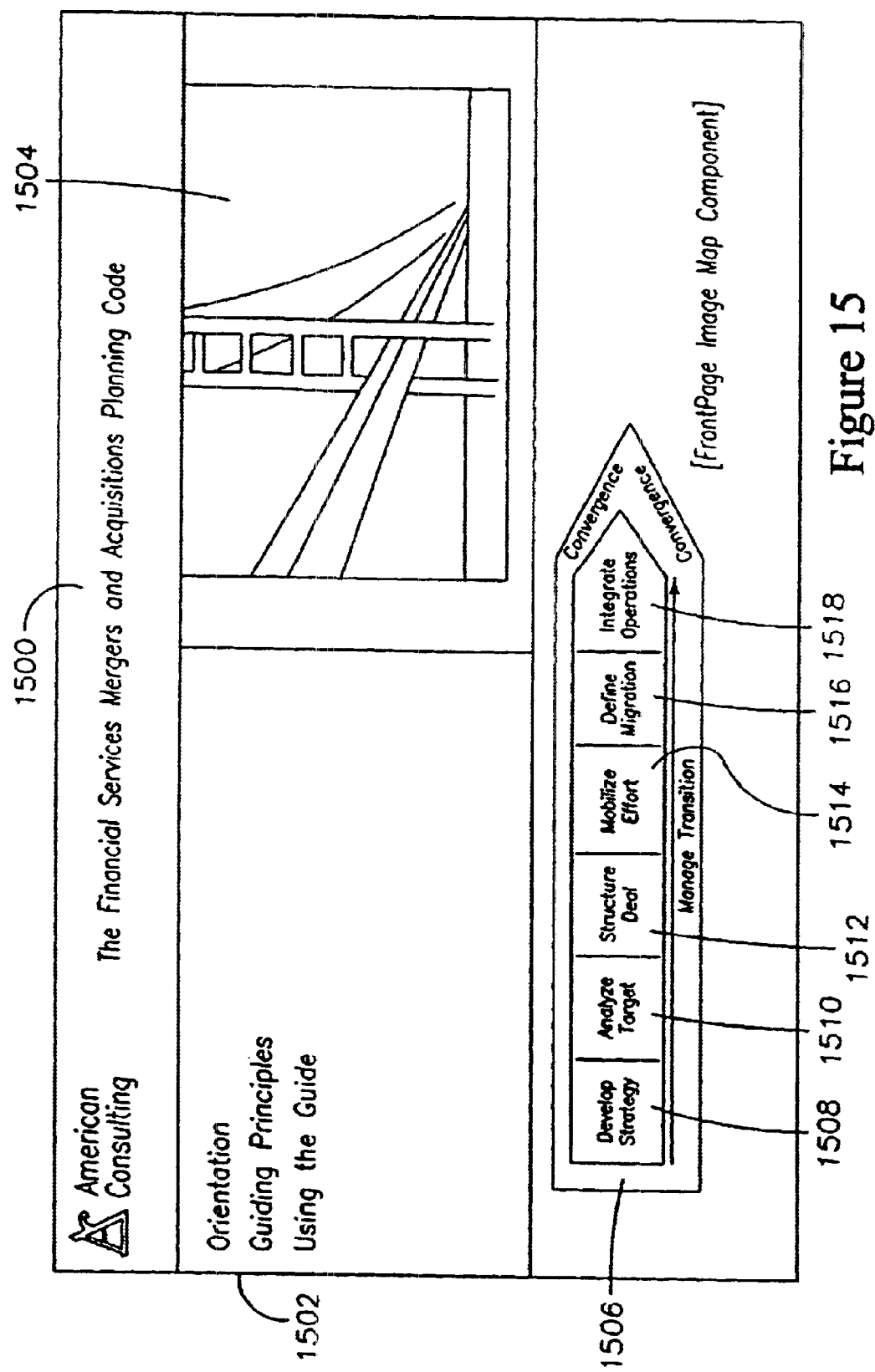
FIG. 15 illustrates an Introduction screen that serves as the point of entry to an exemplary application.

FIG. 15 illustrates the Introduction screen that serves as the point of entry to the application. Please note that Content View Frame is not shown when the user first enters the Planning Guide application. This screen will contain the following elements:

Content View Frame

This frame will display an item of information. This frame is not displayed when the user first enters the Planning Guide Application. This screen is displayed when a user has selected a Menu Item from the Menu Frame (which is described below).

The left side of the Content View frame will contain a "back" and "next" navigation button. In situations where a user must return to the full Introduction Screen, a "home" navigation button will be displayed. The "back" button will return the user to a previous screen. The next button will cause the next item in the menu list to be displayed.

The right side of the Content View frame will display the text for a given area that the user has selected. If the amount text is larger than the right side a scroll bar will appear to allow the user to view all of the text.

Top Banner Frame 1500

This frame will contain the name of the application. The name of the application is "The Financial Services Mergers and Acquisitions Planning Guide", for example. This frame will always be located at the top of the Introduction Screen. No hyperlinks or navigation features are contained in this frame.

Menu Frame 1502

This frame will provide navigation to the introductory sections of the Planning Guide application. It will contain three navigation buttons. When one of these buttons is clicked, a drop down menu will appear. The table below describes exemplary navigation buttons and their respective menu items:

TABLE 45

| Navigation Button | Drop Menu Items | Menu Item Functionality |
|---|---|---|
| About the Planning Guide | Rationale | Displays the Rationale document inside of a content |

TABLE 45-continued

| Navigation Button | Drop Menu Items | Menu Item Functionality |
|---|---|---|
| | | view frame. This should be located underneath the top banner frame. |
| | Description | Displays the Description document inside of a content view frame. This should be located underneath the top banner frame. |
| | Scope | Displays the Scope document inside of a content view frame. This should be located underneath the top banner frame. |
| | Features & Benefits | Displays the Features & Benefits document inside of a content view frame. This should be located underneath the top banner frame. |
| | Intended Use & Audience | Displays the Intended Use & Audience document inside of a content view frame. This should be located underneath the top banner frame. |
| | Rollout & Next Steps | Displays the Rollout & Next Steps document inside of a content view frame. This should be located underneath the top banner frame. |
| Guiding Principles | Guiding Principles | Displays the Guiding Principles document inside of a content view frame. This should be located underneath the top banner frame. |
| Help | Using the Phase Diagrams | Displays the Using the Phase Diagrams document inside of a content view frame. This should be located underneath the top banner frame. |
| | Front Page Entry Points | Displays the Front Page Entry Points document inside of a content view frame. This should be located underneath the top banner frame. |

Picture Frame 1504

The Picture Frame will display a picture of a bridge, for example. The entire frame will be populated by the picture. The picture frame will not provide navigation features.

Chevron Frame 1506

This frame will display a chevron shape. The chevron shape will provide navigation to the phase areas of the application. When a user clicks on a specific area inside of the chevron shape, the application will display the Display View (this is described in the next section). A user click on a chevron navigation area will cause the Display View to display a specific set of frames. The areas within the Chevron shape are classified as either Phase navigation areas (inner) or Manage Transition navigation areas (outer).

The Phase navigation areas that are contained inside of the Chevron frame are listed below:

Develop Strategy 1508

Analyze Target 1510

Structure Deal 1512

Mobilize Effort 1514

Define Migration 1516

Integrate Operations 1518

The Manage Transition navigation areas for the Chevron frame are described below:

Manage transition for Develop Strategy

Manage transition for Analyze Target

Manage transition for Structure Deal

Manage transition for Mobilize Effort

Manage transition for Define Migration

Manage transition for Integrate Operations

Display Screen

Figure 16:
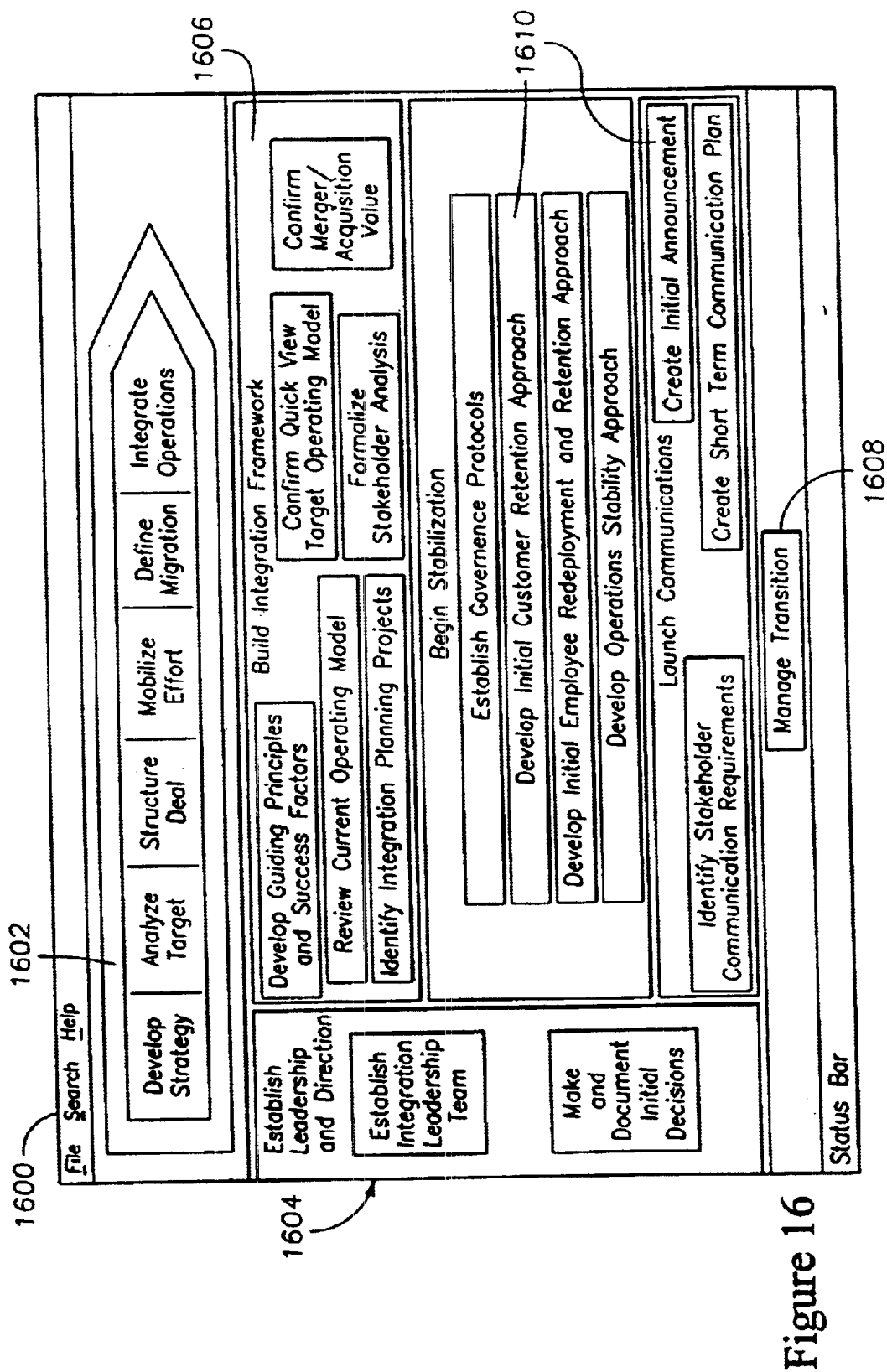
FIG. 16 illustrates a display screen that contains various sets of frames specific to a given Phase or Manage Transition for a given phase.

FIG. 16 illustrates the display Screen 1600 that contains various sets of frames specific to a given Phase or Manage Transition for a given phase. Additionally, the Content View Frame that was described earlier in the Introduction Screen section can be shown within the Display screen. However the Content View frame is not shown when the user first enters the Display Screen.

The frames that are contained within the Display Screen are described below.

Chevron Frame 1602

This frame will display a chevron shape. This frame will always be located at the top of the Display Screen. The chevron shape will provide navigation to the phase areas of the application and also provide information on the entry/exit criteria for a given phase.

Unlike the Chevron frame in the Introduction Screen, this frame will not provide navigation to the Manage transition areas of the application. The Phase Frames that are described later on will provide this functionality.

The Chevron Frame may contain six phase navigation areas. These areas are listed below:

Develop Strategy

Analyze Target

Structure Deal

Mobilize Effort

Define Migration

Integrate Operations

When a given phase navigation area is clicked, a yellow box will appear over the top of the area. The Phase frame will also be displayed below the Chevron frame. The Phase frame will always contain the content for the phase that was clicked on. The yellow box will always appear on top of the Phase Navigation area when it is displayed.

The Chevron frame will contain an "Entry Criteria" button and an "Exit Criteria" button. When either button is clicked, a dialogue box will appear that contains some text that describes the entry or exit criteria for a given phase. The "entry criteria" button will be positioned at the far left of the Chevron Frame. The "exit criteria" button will be positioned at the far right of the Chevron Frame.

The Chevron Frame will contain a "Home" button. The location of this button is not yet decided. Clicking this button will cause the Introduction Screen to be displayed.

Phase Frame 1604

This frame will display an interactive diagram 1606 for a given phase. Each phase will have a unique diagram. However every diagram will always contain a "Manage Transition" button 1608. Clicking this button will cause the "Manage Transition" frame to be displayed. When this happens, the Phase Frame is no longer visible.

Within Phase Frame, each interactive diagram will contain groups of Activity boxes 1610. A user click on an Activity Box will cause a drop down menu to be displayed. See FIG. 18, which illustrates a drop down menu. The menu items will vary depending upon the Activity Box. When the user selects a menu item, the Content View Frame is displayed. When this happens, the Phase Frame is no longer visible. The Chevron Frame will still have a yellow box around the Phase Navigation area that was previously displayed. The user can return to the Phase View by clicking on the Content View Frame's "back" button.

An Activity Box within a Phase Frame will also contain a "Help Question Mark" icon. Clicking on this icon will display a dialogue box that contains a text overview of the Activity.

Manage Transition Frame

This frame will display the specific Manage Transition Frame that corresponds to a given Phase. This frame can be displayed by two different ways: A user can click on a "Manage Transition" navigation area from the Introduction Screen's Chevron Frame. OR A user can click on the Phase Frame's interactive Phase Diagram.

The Manage Transition Frame is horizontally divided into two areas:

The top portion is a "shadow" representation of the Phase that corresponds to the Manage Transition Frame. Clicking on this area will return the user to the respective Phase Frame.

The bottom portion of the Manage Transition Frame will contain Activity Boxes that will display drop down menus when clicked. When user select a menu item, the Content View Frame is displayed and the Manage Transition Frame is no longer visible. Within the Content View Frame, the user can return to the Manage Transition Frame by clicking on the "back" button.

An Activity Box within a Phase Frame will also contain a "Help Question Mark" icon. Clicking on this icon will display a dialogue box that contains a text overview of the Activity.

Exemplary Technical Requirements for the planning guide are as follows:

A www browser; should be Microsoft Internet Explorer 4 or Netscape™ 4.0

A web server that supports CGI programs

ODBC version 2.0 or higher

An ODBC compliant database (Microsoft Access) Perl 5

Figure 17:
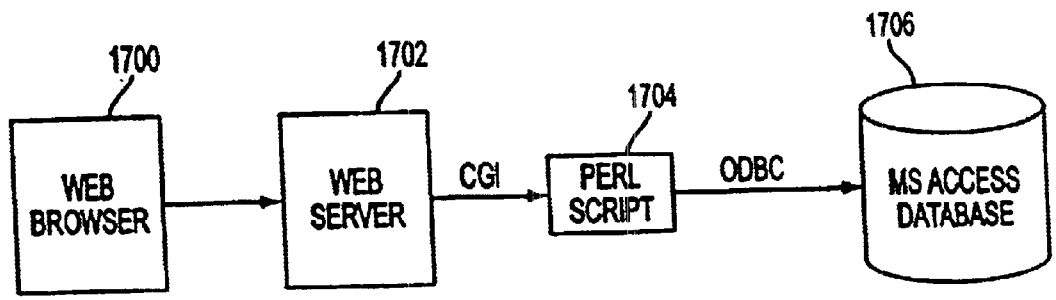
FIG. 17 illustrates the architecture recommended for implementing the planning guide.

FIG. 17 illustrates the architecture recommended for implementing the planning guide. As shown, a MS web server 1702 provides the functionality and data on the server side. Information is requested in the web browser 1700 as the user clicks a particular Planning Guide Phase, Activity or Task. In turn, the web browser communicates with the web server. On the server side, data will be retrieved from the Microsoft Access Database 1706. In order to retrieve data from the database, an ODBC connection is established and a Perl script 1704 is executed. One of the sole purposes of the ODBC connection is to communicate with the database.

From the introduction screen (home page), the user may choose to navigate from the Menu Frame or the Chevron Frame. In both cases, a Display screen results. The menu Frame items navigate to introductory sections of the Planning Guide as described hereinabove. If the user selects a Phase on the chevron bar, the appropriate Phase detail page will show.

Referring again to FIG. 16, the screen shot shown illustrates the Mobilize Effort Phase and its associated Stages and Activities. The chevron bar remains displayed in the Chevron Frame with the chosen Phase highlighted. The user can select Manage Transition as well. In the Phase Frames, each Activity has the capability to display a drop down menu once it is clicked.

Figure 18:
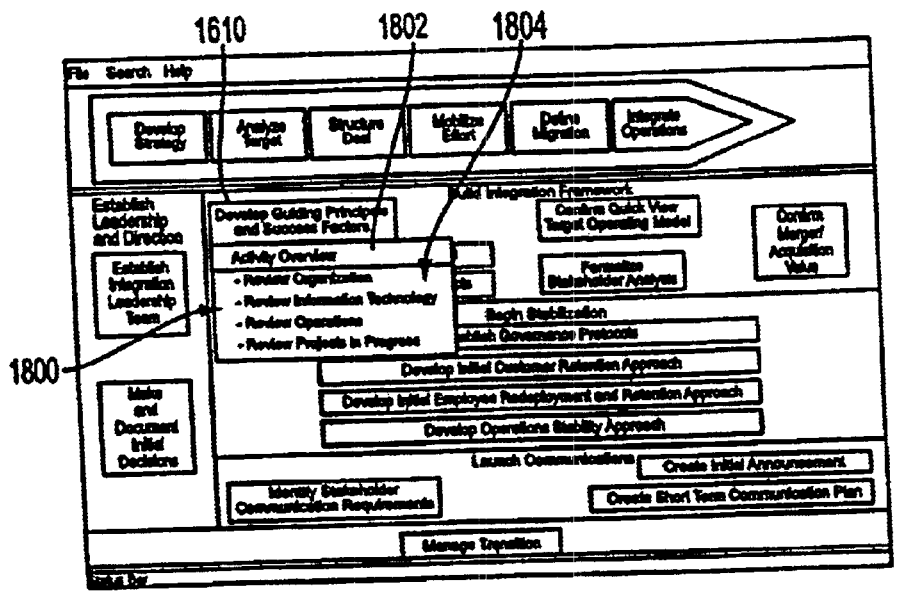
FIG. 18 is an illustration of a screen upon selection of one of the items thereon.

FIG. 18 is an illustration of a screen upon selection of one of the items thereon. Once an Activity 1610 is clicked and a drop down menu 1800 is displayed, the user may choose to view the corresponding 'Activity Overview' 1802 or the corresponding 'Tasks' 1804. The exemplary screen shot of FIG. 18 shows the 'Develop Guiding Principles and Success Factors' Activity drop down menu. Once a drop down box is displayed, each menu item 1802,1804 is highlighted as mouseovers occur.

Figure 19:
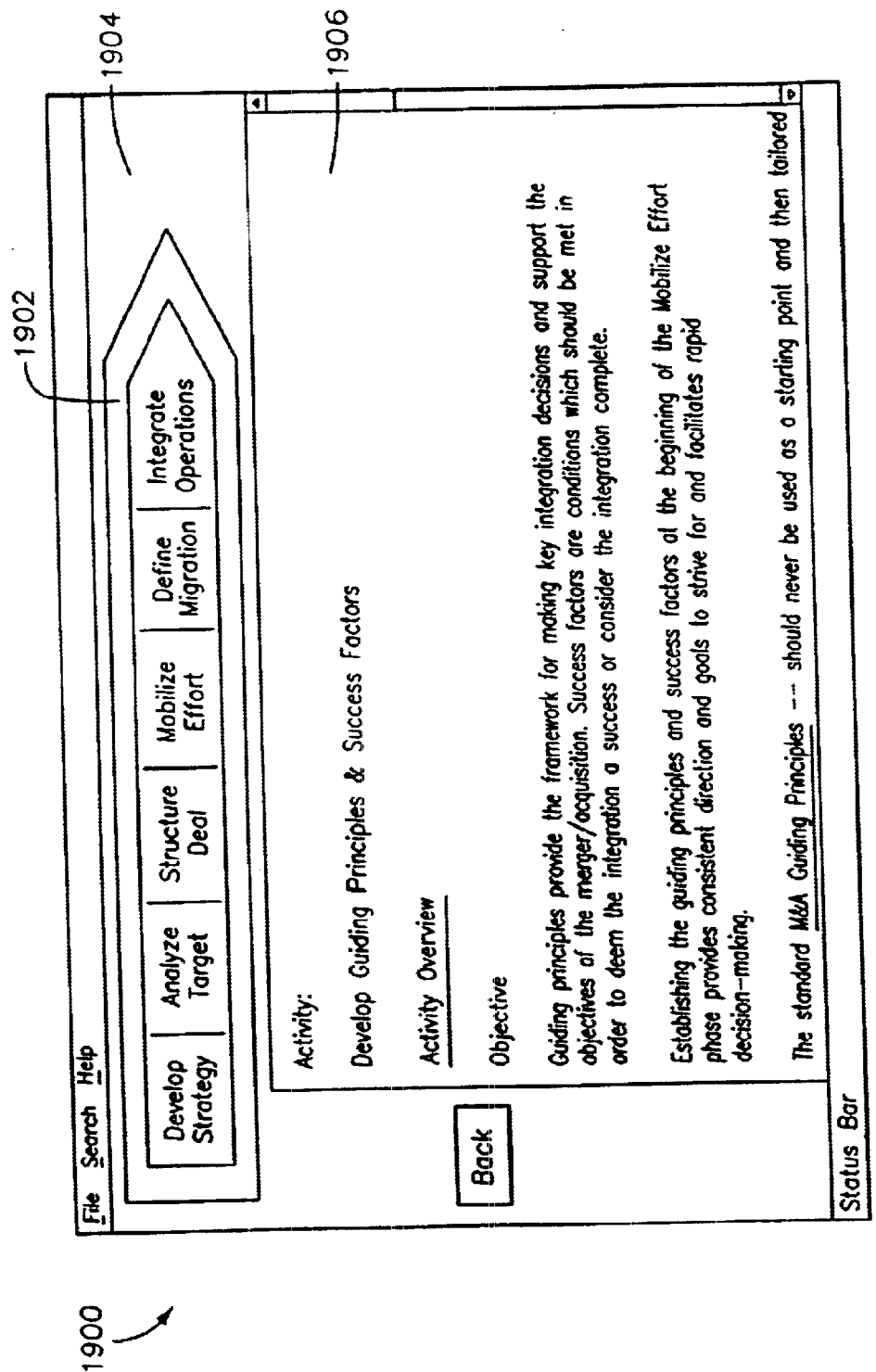
FIG. 19 illustrates a screen after an 'Activity Overview' or 'Task' is chosen.

FIG. 19 illustrates a screen 1900 after an 'Activity Overview' or 'Task' is chosen. As shown, a new Display screen appears with the appropriate information. In FIG. 19, you can see the Display screen is similar to that of the Phase view, where the chevron bar 1902 remains in the Chevron Frame 1904 and the detailed 'Activity Overview' information is displayed in the Content View Frame 1906.

The Planning Guide has many associated documents (Power Point, Excel, Word) that pertain to M&A specific content. These documents exist at the Activity, Task and Question level of the Planning Guide. The user may obtain such documentation while navigating throughout the application.

Industry Solution Packs

The Industry Solution Packs explain key activities, key risks and proven practices that can be applied to specific industries. There are four Industry Solution Packs within Financial Services:

Banking

Health Services

Insurance

Financial Markets

There are several Banking specific processes that are impacted during an M&A event:

Account Renumbering

ATM Processing

Back Office Operations

Branch

Branding

Card Issue/Reissue

Check

Customer

Deposit Operations

Distribution Channels

Forms

General Ledger

Hardware Deployment/Rollout

Loans

Operations Center Consolidations

Passbook Processing

Payment Processing

Private Banking

Product Fulfillment

Tickets

Transportation

Treasury Operations

There are several Health Services specific processes that are impacted during an M&A event:Ancillary Services (e.g., pharmnacy, materials management)

Benefits/Products

Claims Processing

Enrollment and Billing

Financials (AR and AP)

Health Information Management

Member ServicesMember Services

Patient Accounting

Patient Care Management

Products

Providers/Contracting

Sales and Marketing

Underwriting/Actuarial

Utilization Management/Medical Management

There are several Insurance specific processes that are impacted during an M&A event:Agency Management (e.g., agency automation, communications, selection, retention, training)

Actuarial/Regulatory

Claims

Field Ops/Customer Service

IT (e.g., IT governance, system selection, infrastructure, migration planning and sourcing)

Shared Services

Underwriting/Product Development

Merger and Acquisition Lifecycle

Figure 20:
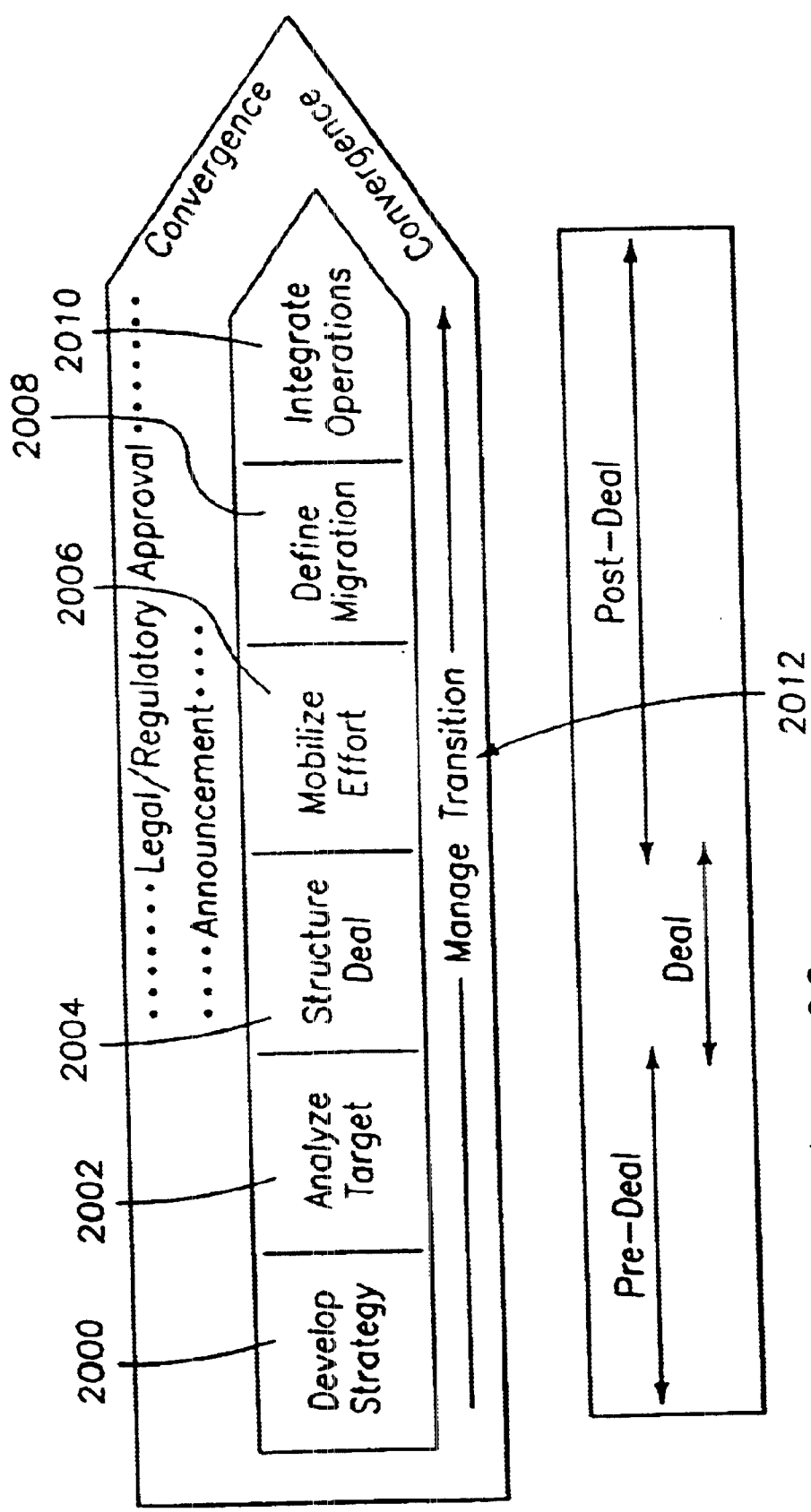
FIG. 20 illustrates several phases in an exemplary Merger and Acquisition (M & A) lifecycle.

FIG. 20 illustrates several phases in an exemplary M & A lifecycle separated into three time periods: Pre-Deal, Deal, and Post-Deal. The Pre-Deal period occurs before, and in preparation of, the deal with respect to a merger or acquisition. The Deal period occurs during actual negotiation and structuring of the deal. The Post-Deal period occurs after the deal has been made. Finally, the companies converge. Due to the uniqueness of each merger or acquisition, a level of flexibility and overlap exists among the phases.

Develop Strategy Phase 2000

During the Pre-Deal period, a strategy is developed in the Develop Strategy phase. Maore particularly, the Develop Strategy phase positions an organization evaluating mergers or acquisitions as growth options. Key activities of this phase include:

developing corporate strategies identifying and assessing M&A options determining financing strategies screening and prioritizing candidates performing synergy assessment and economic benefit modeling selecting target(s)

Analyze Target Phase 2002

During the Analyze Target phase, the organization begins a detailed assessment of a specific target. Key activities of this phase include:

conducting strategic due diligence identify operational sources of value create financial due diligence plan Structure Deal Phase 2004

During the Structure Deal phase, the two organizations agree on the specifics of the transaction and begin to execute the arrangement. Key activities of this phase include:

performing valuation performing financial and legal due diligence obtaining a fairness opinion developing contacts and relationships with targets negotiating terms and conditions of the deal beginning legal/regulatory approval activities Mobilize Effort 2006

Figure 21:
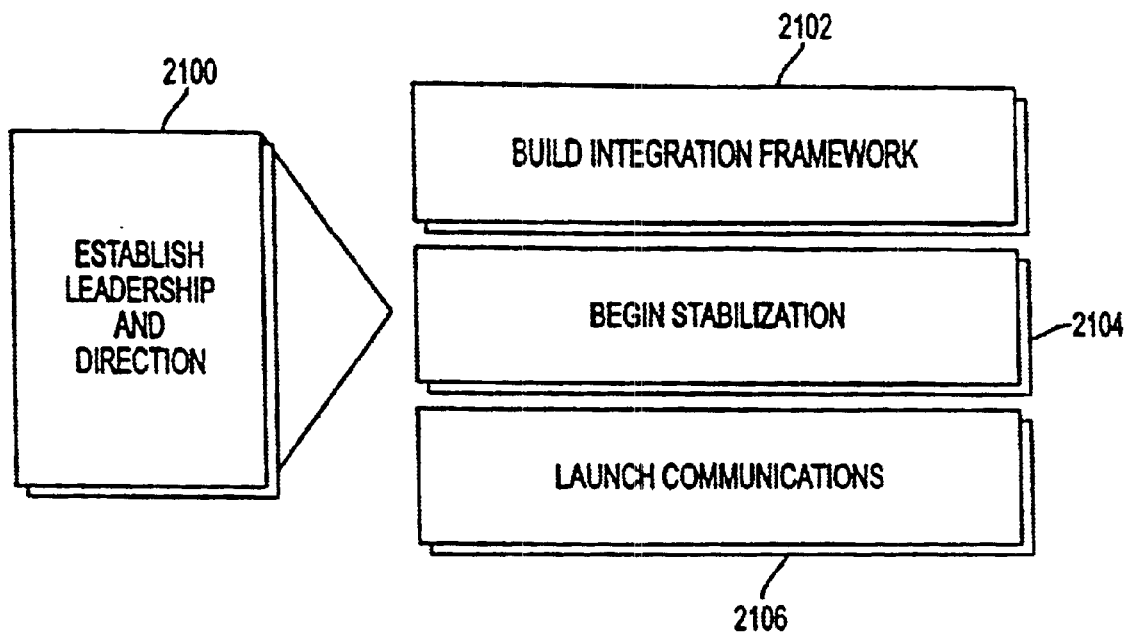
FIG. 21 illustrates key activities of the Mobilize Effort phase.

During the Mobilize Effort phase, the organization establishes the methods and resources required to communicate the deal and conduct the integration. As shown in FIG. 21, key activities of this phase include:

establish leadership and direction by identifying organization and integration team leadership and making initial strategic decisions 2100 building the integration framework 2102 beginning stabilization activities 2104 launching communications, including announcement of the deal 2106

Figure 22:
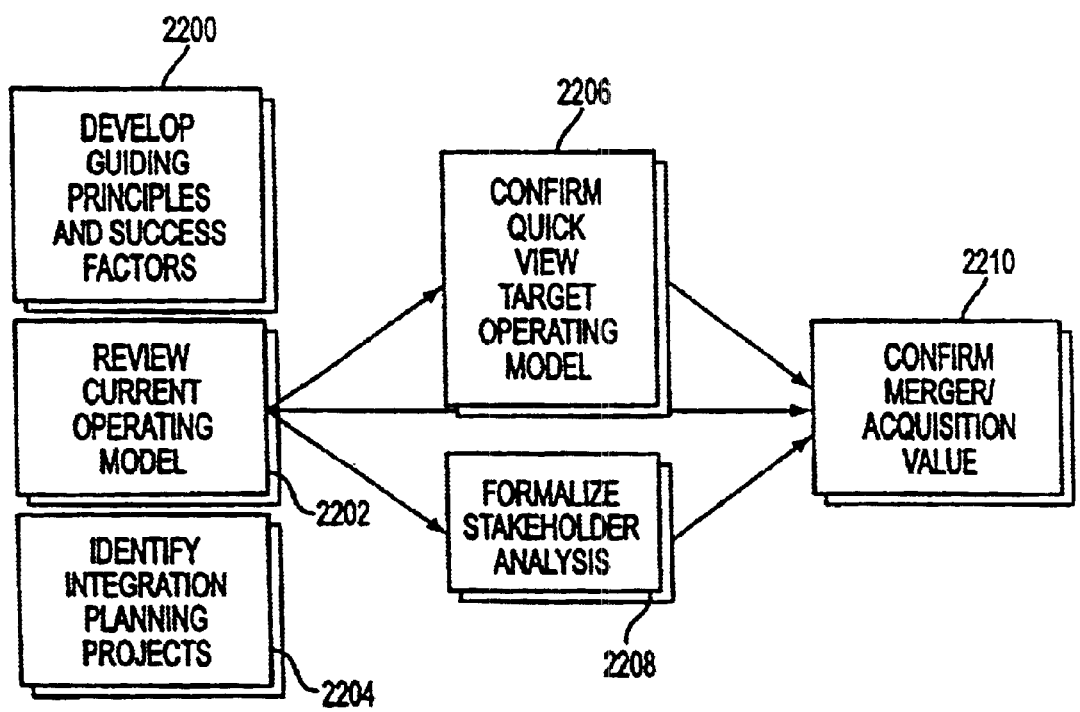
FIG. 22 is a flow chart depicting several activities useful for building the integration framework in accordance with activity 2102 of FIG. 21.

FIG. 22 is a flow chart depicting several activities useful for building the integration framework in accordance with activity 2102 of FIG. 21. In a first phase, guiding principles and success factors are developed in activity 2200. The current operating model is reviewed in activity 2202 while integration planning projects are identified in activity 2204.

In a second phase, the Quick View Target Operating Model is confirmed in operation 2206. In operation 2208, stakeholder analysis is formalized. Finally, in operation 2210, the value of the merger or acquisition is confirmed.

Figure 23:
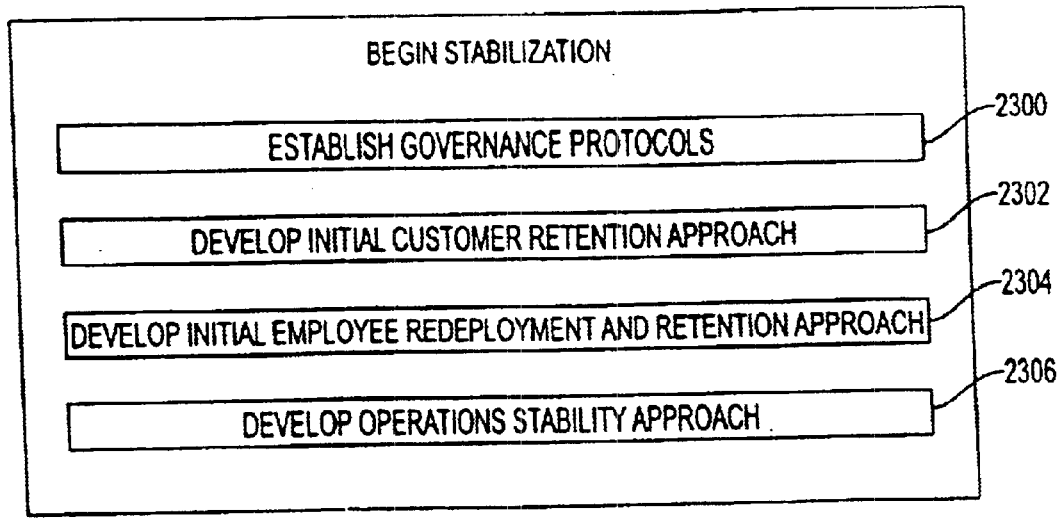
FIG. 23 illustrates several stabilization activities in accordance with activity 2104 of FIG. 21.

FIG. 23 illustrates several stabilization activities in accordance with activity 2104 of FIG. 21. Governance protocols are established in activity 2300 and, in activity 2302, an initial customer retention approach is developed. In activity 2304, an initial employee redeployment and retention approach is developed. Also, an operations stability approach is developed in activity 2306.

Figure 24:
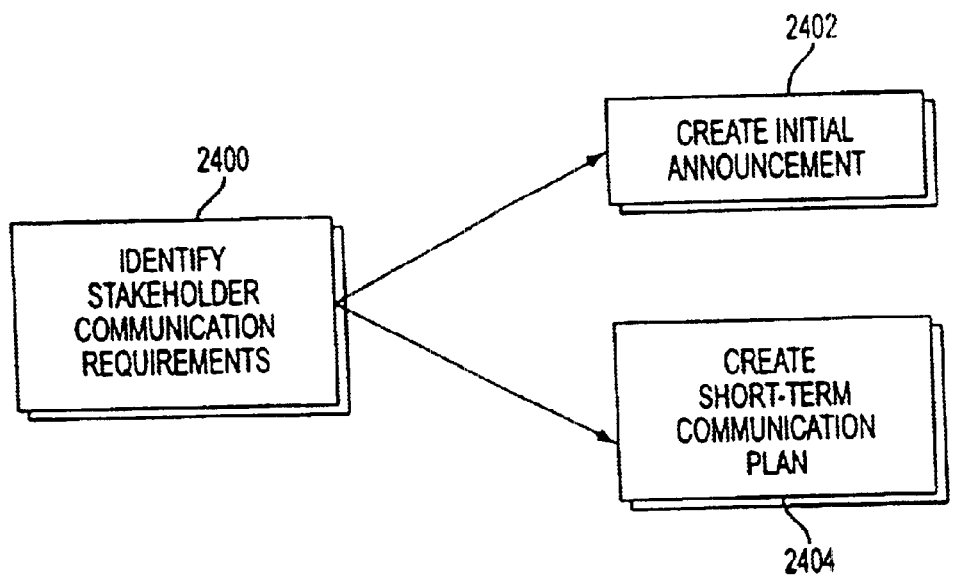
FIG. 24 shows a process for launching communications in accordance with activity 2106 of FIG. 21.

FIG. 24 shows a process for launching communications in accordance with activity 2106 of FIG. 21. In activity 2400, stakeholder communication requirements are identified. Then, the initial announcement and a short term communication plan are created. See activities 2402 and 2404.

Define Migration 2008

Figure 25:
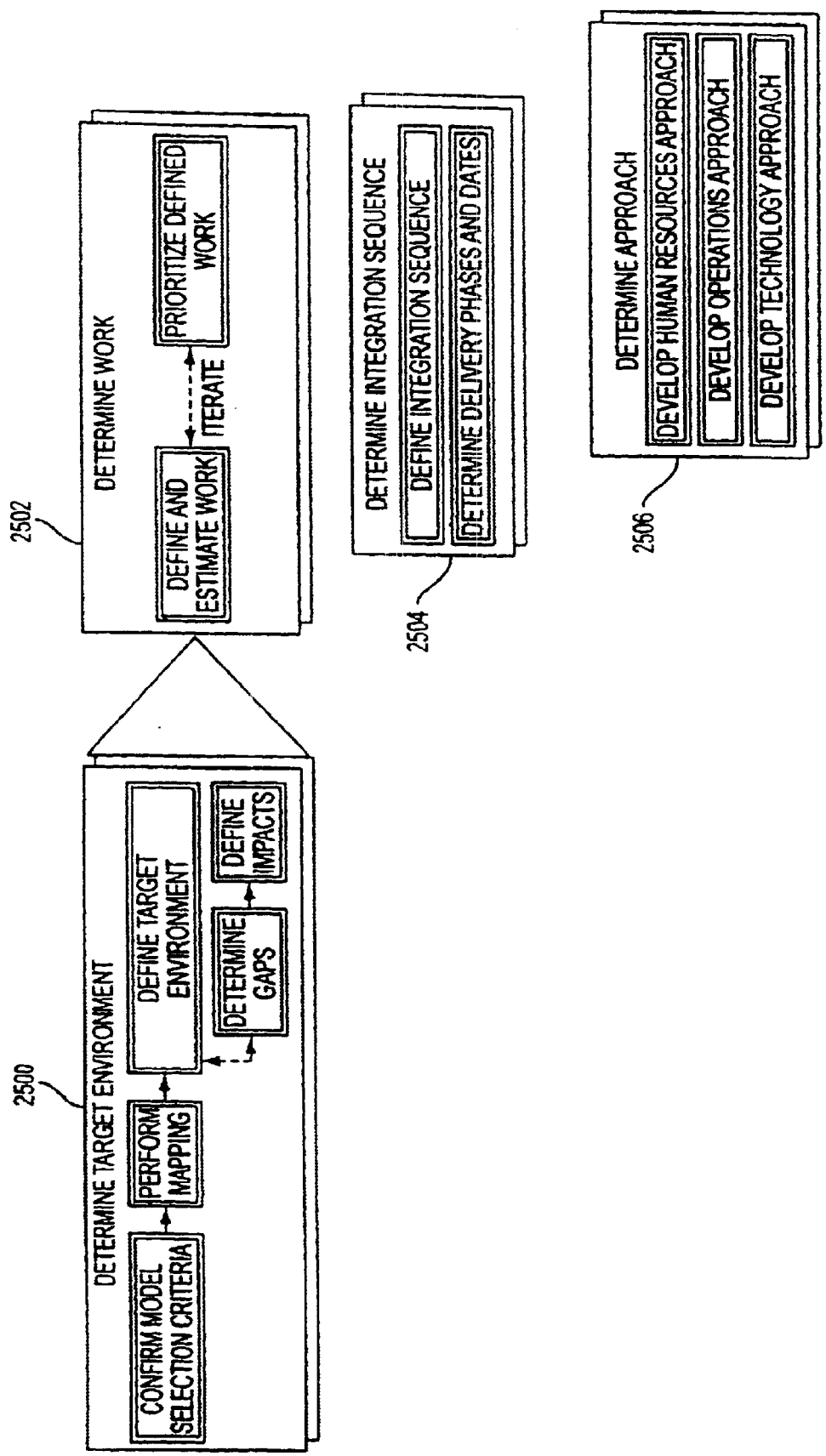
FIG. 25 illustrates many of the key activities and subactivites that may be performed during the define migration phase of an M & A lifecycle.

The Define Migration phase establishes what the integrated environment will be and how the organization will migrate to it. FIG. 25 illustrates many of the key activities and subactivites that may be performed during the define migration phase.

mapping and analyzing current environments to determine target environment 2500 estimating overall work effort and budget required 2502 establishing integration sequence and timeline 2504 determining high level approaches for human resources, operations and technology 2506

Integrate Operations 2010

The Integrate Operations phase, the organization conducts the migration to the integrated environment. Key activities for the phase include:

developing detailed workplans and estimates performing detailed design, development and testing communicating the target environment to employees and conducting training communicating to impacted customer segments converting to the target environment preparing for post-implementation stabilization and support Manage Transition Phase 2012

Figure 26:
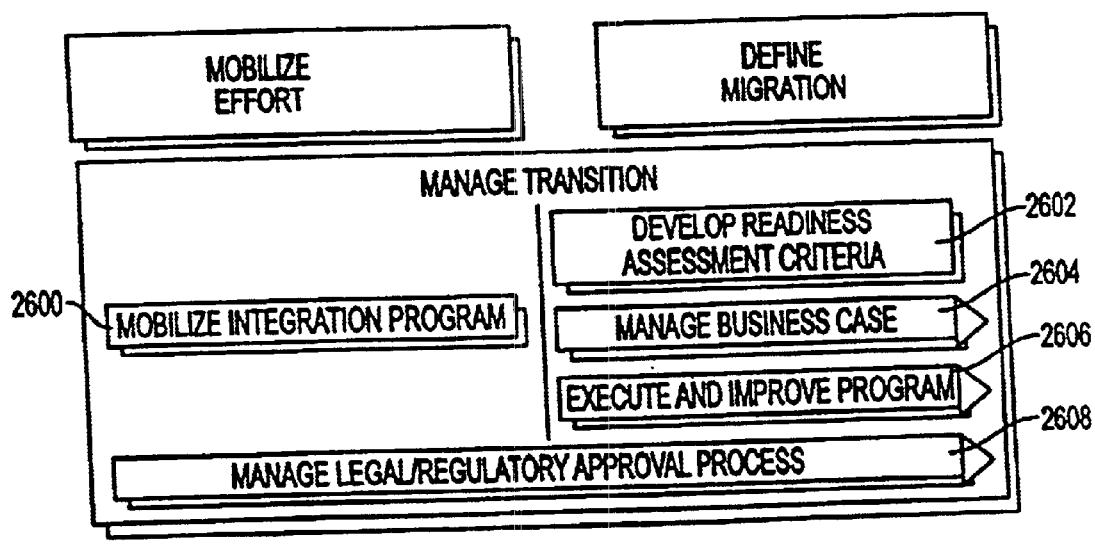
FIG. 26 illustrates several key activities that occur during the Mobilize Effort and Define Migration phases of an M & A lifecycle.

The Manage Transition phase occurs throughout the entire lifecycle of the merger or acquisition. Key activities include:
managing the business case
initiating an overall program management structure
developing an approach to risk and issue management
managing integration timeline
estimating and managing the work effort
establishing a measurement framework FIG. 26 illustrates several key activities that occur during the Mobilize Effort and Define Migration phases. An integration program is mobilized in activity 2600 during the Mobilize Effort phase. In the Define Migration phase, readiness assessment criteria is developed in activity 2602 while business cases are managed in operation 2604. The program is executed during operation 2606 and continues past the Define Migration Phase. In activity 2608, the legal/regulatory approval process is performed through both phases and continues beyond the Define Migration phase.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

We claim:

1. A method for facilitating the navigation of data comprising:
   (a) providing a first graphical representation of a chronologically-ordered relationship among a plurality of links, wherein the first graphical representation is a chevron;
   (b) providing a user with the plurality of links for the first graphical representation, each link having a second graphical representation that corresponds to data, wherein each second graphical representation is within the first graphical representation;
   (c) retrieving the data upon selection of a second graphical representation; and
   (d) displaying the data as tasks required to generate a deliverable, wherein the tasks are displayed so as to imply a relationship among the tasks.

2. The method as set forth in claim 1, wherein the relationship is a progressional relationship.

3. The method as set forth in claim 1, wherein the relationship is a sequential relationship.

4. The method as set forth in claim 1, wherein the chevron implies a direction.

5. The method as set forth in claim 1, wherein the chevron is a pointer.

6. The method as set forth in claim 1, wherein a currently selected link is visually differentiated with respect to the remaining links.

7. The method as set forth in claim 1, wherein each second graphical representation has a shape similar to that of the first graphical respresentation.

8. The method as set forth in claim 1, wherein the links are continuously displayed with the data to continuously imply the relationship.

9. A system for facilitating the navigation of data comprising:
   (a) memory for storing a plurality of data pages;
   (b) a display for providing a user with a first graphical representation of a chronologically-ordered relationship among a plurality of links, wherein the first graphical representation is a chevron, each link having a second graphical representation that corresponds to a data page, wherein each second graphical representation is within the first graphical representation; and
   (c) an input device for retrieving the data pages upon selection of a second graphical representation corresponding to a link, wherein the data is displayed as tasks required to generate a deliverable and displayed so as to imply a relationship among the tasks.

10. The system as set forth in claim 9, wherein the relationship is a progressional relationship.

11. The system as set forth in claim 9, wherein the relationship is a sequential relationship.

12. The system as set forth in claim 9, wherein the chevron implies a direction.

13. The system as set forth in claim 12, wherein the chevron is a pointer.

14. The system as set forth in claim 9, wherein a currently selected link is visually differentiated with respect to the remaining links.

15. The system as set forth in claim 9, wherein each second graphical representation has a shape similar to that of the first graphical representation.

16. The system as set forth in claim 9, wherein the links are continuously displayed with the data pages to continuously imply the relationship.

17. A computer program embodied on a computer-readable medium for facilitating the navigation of data comprising:
   (a) a code segment that provides a first graphical representation of a chronologically-ordered relationship among a plurality of links, each link corresponding to data, wherein the first graphical representation is a chevron;
   (b) a code segment that retrieves the data upon selection of a second graphical representation corresponding to each link, wherein each second graphical representation is within the first graphical representation; and
   (c) a code segment that displays the data as tasks required to generate a deliverable so as to imply a relationship among the tasks.

18. The computer program as set forth in claim 17, wherein the relationship is a progressional relationship.

* * * * *